United States Patent
Aizawa

(10) Patent No.: US 9,129,383 B2
(45) Date of Patent: Sep. 8, 2015

(54) CHARACTER STRING DETECTION DEVICE, IMAGE PROCESSING DEVICE, CHARACTER STRING DETECTION METHOD, CONTROL PROGRAM AND STORAGE MEDIUM

(75) Inventor: Tomoyoshi Aizawa, Kyoto (JP)

(73) Assignee: OMRON Corporation, Kyoto (JP)

(*) Notice: Subject to any disclaimer, the term of this patent is extended or adjusted under 35 U.S.C. 154(b) by 127 days.

(21) Appl. No.: 13/985,528

(22) PCT Filed: Mar. 17, 2011

(86) PCT No.: PCT/JP2011/056428
§ 371 (c)(1),
(2), (4) Date: Sep. 12, 2013

(87) PCT Pub. No.: WO2012/120695
PCT Pub. Date: Sep. 13, 2012

(65) Prior Publication Data
US 2014/0023267 A1    Jan. 23, 2014

(30) Foreign Application Priority Data
Mar. 10, 2011    (JP) ................. 2011-053618

(51) Int. Cl.
*G06K 9/34*    (2006.01)
*G06K 9/62*    (2006.01)
(Continued)

(52) U.S. Cl.
CPC ............ *G06T 7/0081* (2013.01); *G06K 9/3266* (2013.01); *G06K 9/342* (2013.01); *G06K 9/344* (2013.01); *G06K 9/4652* (2013.01)

(58) Field of Classification Search
CPC ... G06K 9/3266; G06K 9/325; G06K 9/3258; G06K 9/34; G06K 9/342; G06K 9/344; G06T 7/0081; G06T 7/408

USPC .................. 382/162, 164, 165, 225; 345/589
See application file for complete search history.

(56) References Cited

U.S. PATENT DOCUMENTS 6,701,010 B1 * 3/2004 Katsuyama .................. 382/165
6,771,813 B1 * 8/2004 Katsuyama .................. 382/165

FOREIGN PATENT DOCUMENTS

EP        0935216 A2    8/1999
JP        8-205043 A    8/1996
(Continued)

OTHER PUBLICATIONS

International Search Report for corresponding International Application No. PCT/JP2011/056428, mailed May 31, 2011 (4 pages).
M. Okutomi et al., "Digital image processing"; CG-ARTS Society Publisher; (Second Impression of the Second Edition); 12-2 "Feature point detection"; Mar. 1, 2007, pp. 208-210 (2 pages).
Extended European Search Report issued in corresponding European Application No. 11860629.2, mailed Apr. 30, 2015 (7 pages).
(Continued)

*Primary Examiner* — Kanjibhai Patel
(74) *Attorney, Agent, or Firm* — Osha Liang LLP

(57) ABSTRACT

A character string detection device for detecting a character string including at least one character in an image has a clustering unit that defines at least one cluster including at least a fixed number of pixel groups having similar colors based on color information included in each pixel configuring the image, a clipping unit that partitions the image into a region of the pixel groups belonging to the cluster defined by the clustering unit and a region of other pixel groups, and generating a clipped image excluding the region of the other pixel groups from the image, and a character string detection unit that detects each character in a detection target character string to be detected so as to detect the detection target character string in the clipped image generated by the clipping unit.

18 Claims, 13 Drawing Sheets

(51) Int. Cl.
*G06T 7/00* (2006.01)
*G06K 9/32* (2006.01)
*G06K 9/46* (2006.01)

(56) References Cited

FOREIGN PATENT DOCUMENTS

| JP | 10-191190 A | 7/1998 |
|---|---|---|
| JP | 2006-134156 A | 5/2006 |
| JP | 2008-004116 A | 1/2008 |
| JP | 2008-131413 A | 6/2008 |
| JP | 2008-287735 A | 11/2008 |

OTHER PUBLICATIONS

H. Takahashi et al.; "Extraction of Hangul Text from Scenery Images by Using Hangul Structure"; Graduate School of Information Science & Engineering, Tokyo Institute of Technology; Tokyo, Japan, vol. J88-D-II, No. 9; pp. 1808-1816; Sep. 2005 (9 pages).

M. R. Lyu et al.; "A Comprehensive Method for Multilingual Video Text Detection, Localization, and Extraction"; IEEE Transactions on Circuits and Systems for Video Technology; vol. 15, No. 2; pp. 243-255; Feb. 2005 (13 pages).

R. Lienhart; "Video OCR: A Survey and Practioner's Guide"; Kluwar Academic Publ, U.S.; Video Mining, Chapter 6; pp. 155-183 (29 pages).

* cited by examiner

|  | エ | ー | ス |
|---|---|---|---|
| Character order | 1 | 2 | 3 |
| Retrieval order (Priority rank) | 2 | 3 | 1 |
| Already detected |  |  | Detected |

Fig. 6

| Character code | Character | Priority index | Primary model | Secondary model |
|---|---|---|---|---|
| ⋮ | ⋮ | ⋮ | ⋮ | ⋮ |
| ***4 | エ | 10 | | |
| ⋮ | ⋮ | ⋮ | ⋮ | ⋮ |
| ***11 | サ | 15 | | |
| ***12 | シ | 20 | | |
| ***13 | ス | 20 | | |
| ⋮ | ⋮ | ⋮ | ⋮ | ⋮ |

CHARACTER STRING DETECTION DEVICE, IMAGE PROCESSING DEVICE, CHARACTER STRING DETECTION METHOD, CONTROL PROGRAM AND STORAGE MEDIUM

BACKGROUND

1. Technical Field

The present invention relates to the technique of processing data of an image such as a still image or video to detect a character in the image, and particularly relates to the technique for improving character detection accuracy in a case where the image has a complex background.

2. Related Art

There have been many conventional techniques of detecting a specific character (keyword) in an image (still image or video image). For example, Patent Documents 1 to 3 each disclose the technique of cutting out all character regions in an image, applying a character recognition processing to each of the cut out regions to convert to text data, and then judging whether or not each is a keyword to be detected.

However, it may be necessary to apply the recognition processing to all the characters cut out of the image in order to judge whether or not it is a character string to be detected. This leads to increase in processing time.

For example, if a recognition target character is in Japanese or Chinese, these languages each include a large number of characters (each include at least 3000 Chinese characters of the first level only and at least 6000 Chinese characters of the first and second levels). In order to execute the character recognition processing in these languages, a comparing processing with at least 3000 to 6000 characters is therefore required. The character recognition processing thus becomes high-load processing requiring significant time. A comparing processing with the keyword is further executed on all the recognized character strings, thereby further increasing the processing time.

There is increase in processing time in a case of processing a video image where the real-time property is required, than in a case of processing a still image.

Upon cutting out a character string, in general, pixel values suddenly change at the boundary between a character and a background. Edges are thus extracted with use of a Sobel filter or a Laplacian filter, and such a portion is extracted as a character string region. If there is a complex background, however, an edge is extracted also from a portion where pixel values suddenly change not at a character but in the background. This may lead to incorrect detection of the background as a character string region despite the fact that there is no target character string, resulting in low detection accuracy.

According to the technique disclosed in Patent Document 2, for example, in order to detect a telop in a television picture, a character string in the picture (that is, a telop) is detected with use of a feature of the telop. More specifically, with use of the feature that a telop mostly having a fixed color and concentration (typically in white in the case of a telop) stays in a same position for fixed time, a pixel satisfying the feature is extracted as a character string candidate. If the character string of a keyword to be detected however does not satisfy the condition of the telop, it is accordingly impossible to detect the detection target character string.

Patent Document 4 discloses the technique of initially specifying a region of a road sign or a signboard in an image based on a feature value such as intensity or roundness, extracting a character string region in the specified signboard region, and comparing with preliminarily prepared dictionary data, to recognize (characters on) the signboard.

In the technique described in Patent Document 4, the candidate region including the character string is narrowed to some extent by specifying the signboard region, thereby to improve efficiency of a character string detection processing. Similarly to Patent Documents 1 to 3 requiring the comparing processing with at least 3000 to 6000 characters, there is still increase in processing time.

The technique described in Patent Document 4 relates to a technique of character string detection in a signboard that is supposed to have remarkable contrast between a background color and a character color. In terms of detection accuracy, the technique of character string detection described in Patent Document 4 is therefore not applicable to detection of a character string in complex background colors. If the character string of a keyword to be detected is included in a region not satisfying the feature of the signboard, it is accordingly impossible to detect the detection target character string.

In contrast to the above technique, Patent Documents 5 and 6 each disclose the technique of detecting a target character string by comparing between images of character regions. More specifically, each character font configuring a specific keyword is initially read out individually and drawn to generate a character string image corresponding to the keyword. A similar image retrieval is subsequently conducted in an image, with the character string image as a key, so as to detect the keyword in the image.

According to the techniques described in Patent Documents 5 and 6, the character string is detected by comparing processing between images. There is no need to apply character recognition processing to all the character regions in the image, thereby leading to reduction in processing time in comparison to the techniques described in Patent Documents 1 to 4. Furthermore, the detection target character string is detected through matching processing between images. It is thus possible to adjust an allowable range of noises in the background by arbitrarily setting such as a threshold of a concordance rate. This allows noises in the background to some extent and solves defects such as completely failing to detect the detection target character string.

For example, the corner detection technique or the outline detection technique described in Non-Patent Document 1 can be used as the technique of detecting a feature value of a character in an image so as to be used for the comparing processing between images.

Patent Document 1: Japanese Unexamined Patent Publication JP 08-205043 A (Published on Aug. 9, 1996)
Patent Document 2: Japanese Unexamined Patent Publication JP 2006-134156 A (Published on May 25, 2006)
Patent Document 3: Japanese Unexamined Patent Publication JP 2008-131413 A (Published on Jun. 5, 2008)
Patent Document 4: Japanese Unexamined Patent Publication JP2008-287735 A (Published on Nov. 27, 2008)
Patent Document 5: Japanese Unexamined Patent Publication JP 10-191190 A (Published on Jul. 21, 1998)
Patent Document 6: Japanese Unexamined Patent Publication JP 2008-004116 A (Published on Jan. 10, 2008)
Non-Patent Document 1: Masatoshi OKUTOMI et al., "Digital image processing", CG-ARTS Society Publisher, Mar. 1, 2007 (Second Impression of the Second Edition), pp. 208-210, 12-2 "Feature point detection"

SUMMARY

According to the techniques described in Patent Documents 5 and 6, a character string is detected by the comparing processing between images. Here, if a target image has a complex background below a character, it is difficult to execute the matching processing accurately. A character string image of a preliminarily prepared model simply includes a drawn character string with a monotonous background. When such a model image is compared with an image of the character string region including a complex background, a sufficient concordance rate is not obtainable as a result of the comparison between the images, even if character strings matches with each other. This may lead to incorrect detection that it is not character string or that it is different from the detection target character string.

The techniques described in Patent Documents 5 and 6 may result in capacity of memory storing character string images used for the comparing processing.

For example, in the languages such as Japanese, Chinese, and Korean, the direction of writing characters can be both horizontal writing and vertical writing. Same character strings in vertical writing and horizontal writing are recognized as different character string images. It is thus necessary to prepare both images in vertical writing and horizontal writing in the techniques described in Patent Documents 5 and 6. The increase in processing load and memory capacity are serious in this case. This increase in images to be compared causes increase in the processing time necessary for the similar image retrieval. As described above, the processing time is worse in a case of processing a video image where the real-time property is required, than in a case of processing a still image.

Furthermore, if there is concern of being judged as a different character due to difference in size of characters or difference in style of characters, it is necessary to store, as model images, a plurality of character string images corresponding to varied character sizes and styles. The memory capacity and processing time are still worse in this case.

The above occurs not only to characters in the specific languages described above but arise commonly in the detection processing of characters in any language. Moreover, the above may occur similarly upon detection of characters in images including not only video images but also still images.

According to one or more embodiments of the present invention, a character string detection device, an image processing device, a character string detection method, a control program, and a storage medium, enable improvement in detection accuracy of character string detection processing with respect to an image. One or more embodiments of the present invention enable both improvement in detection accuracy and improvement in processing efficiency in the character string detection device for executing character string detection processing.

One or more embodiments of the present invention provides a character string detection device for detecting a character string including at least one character in an image, the character string detection device including: a clustering means for defining at least one cluster including at least a fixed number of pixel groups having similar colors based on color information included in each pixel configuring the image; a clipping means for partitioning the image into a region of the pixel groups belonging to the cluster defined by the clustering means and a region of other pixel groups, and generating a clipped image excluding the region of the other pixel groups from the image; and a character string detection means for detecting each character in a detection target character string to be detected so as to detect the detection target character string in the clipped image generated by the clipping means.

In the above configuration, the clustering means categorizes the detection target regions in the image for each pixel group having a similar color, so as to define a cluster. The clipping means then generates the clipped image that includes only the pixel group in the cluster obtained for each similar color.

The character string detection means has only to detect a target character not in the entire image but in the clipped image in which only the similar color is grouped (other colors being detracted).

At least one of some categorized clusters should have a color corresponding to the color of the character string. The clipped image obtained for the cluster having the color of the character is assumed to indicate information on the character itself including utmost no excessive information. Use of the information obtained from the cluster having the color of the character enables accurate comparison between characters with no influence of any complex background of the character, if any.

This character string detection device according to one or more embodiments of the present invention is applicable to any image processing device that is capable of processing images. Such an image processing device equipped with the character string detection device according to one or more embodiments of the present invention is also included in the scope of the present invention.

One or more embodiments of the present invention provides a character string detection method of detecting a character string including at least one character in an image, the character string detection method including: a clustering step of defining at least one cluster including at least a fixed number of pixel groups having similar colors based on color information included in each pixel configuring the image; a clipping step of partitioning the image into a region of the pixel groups belonging to the cluster defined in the clustering step and a region of other pixel groups and generating a clipped image excluding the region of the other pixel groups from the image; and a character string detection step of detecting each character in a detection target character string to be detected so as to detect the detection target character string in the clipped image generated in the clipping step.

The character string detection device can be embodied by a computer. In this case, a control program of the character string detection device that embodies the character string detection device by the computer being operated as the respective means, and a computer-readable storage medium storing the control program are also included in the scope of the present invention.

One or more embodiments of the present invention provides a character string detection device for detecting a character string including at least one character in an image, the character string detection device including: a clustering means for defining at least one cluster including at least a fixed number of pixel groups having similar colors based on color information included in each pixel configuring the image; a clipping means for partitioning the image into a region of the pixel groups belonging to the cluster defined by the clustering means and a region of other pixel groups and generating a clipped image excluding the region of the other pixel groups from the image; and a character string detection means for detecting each character in a detection target character string to be detected so as to detect the detection target character string in the clipped image generated by the clipping means.

One or more embodiments of the present invention provides a character string detection method of detecting a character string including at least one character in an image, the character string detection method including: a clustering step of defining at least one cluster including at least a fixed number of pixel groups having similar colors based on color information included in each pixel configuring the image; a clipping step of partitioning the image into a region of the pixel groups belonging to the cluster defined in the clustering step and a region of other pixel groups and generating a clipped image excluding the region of the other pixel groups from the image; and a character string detection step of detecting each character in a detection target character string to be detected so as to detect the detection target character string in the clipped image generated in the clipping step.

There is accordingly exerted the effect of improvement in detection accuracy of character string detection processing in the image.

BRIEF DESCRIPTION OF THE DRAWINGS

FIG. 6 is a chart exemplifying a character database stored in a character information storage unit in the character string detection device according to one or more embodiments of the present invention.

DETAILED DESCRIPTION

Described hereinafter are embodiments of the present invention with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Exemplified below is a case where a DVD player for reproducing and displaying images is equipped with a character string detection device according to one or more embodiments of the present invention.

The character string detection device according to one or more embodiments of the present invention is applicable, not limited to a DVD player, but to any image processing device that is capable of processing images. For example, the character string detection device according to one or more embodiments of the present invention is applicable to any type of image processing device that is capable of processing still images, video images, or both of still and video images, such as a digital video recorder/player, a Blu-ray disc recorder/player, a digital video camera, a digital camera, a digital television, a personal computer (PC), a mobile phone, a printer, a scanner, a multifunction device, and a facsimile device, although not being limited thereto. It is noted that both still image data and video data are herein referred to as images.

The character string detection device according to one or more embodiments of the present invention is capable of detecting a designated character string accurately, and efficiently with a low load processing, in an image even if the image has a complex background. Described below is a configuration of a DVD player as the character string detection device according to one or more embodiments of the present invention.

[Configuration of DVD Player 1]

Figure 1:
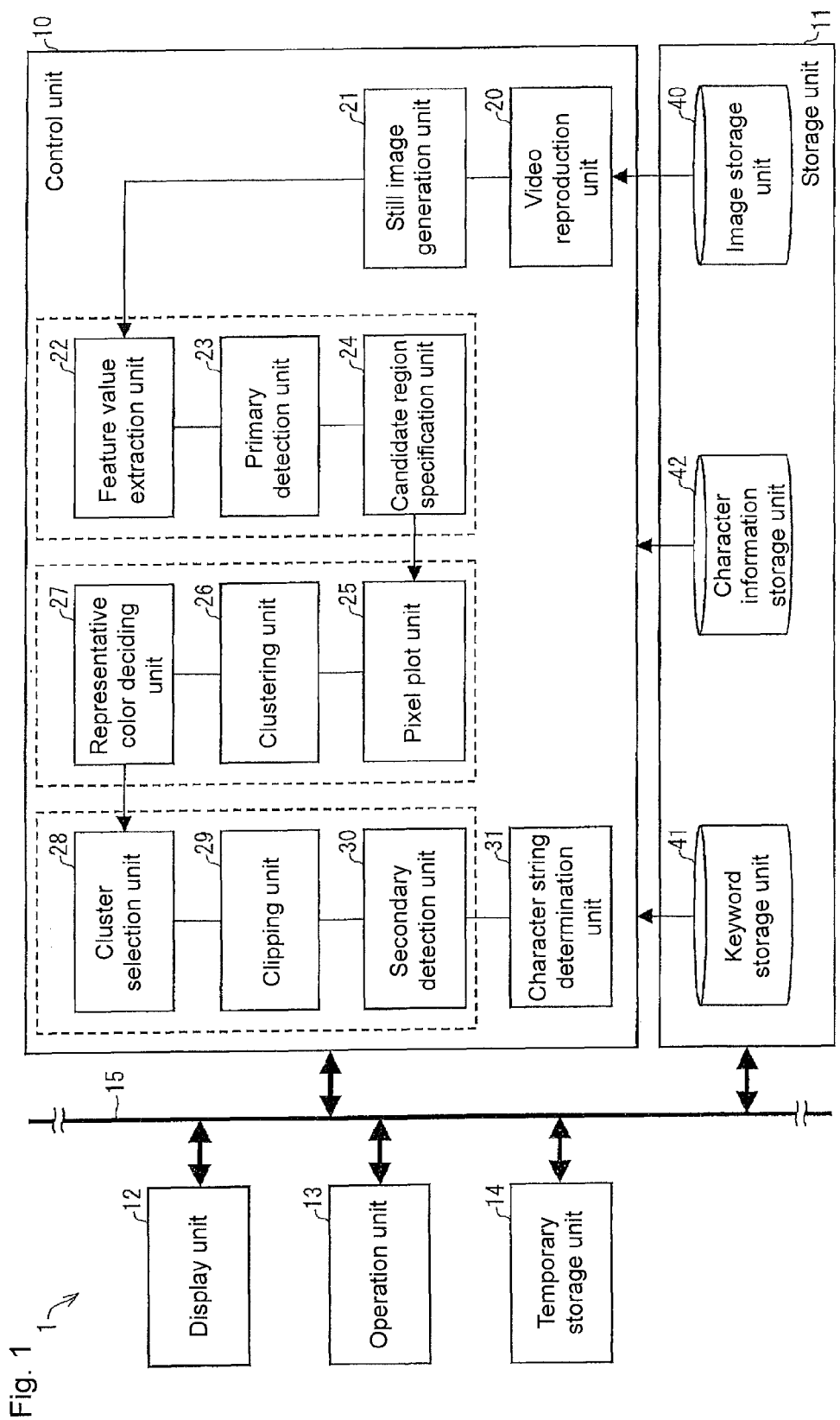
FIG. 1 is a block diagram showing a configuration of a principal part in a DVD player according to one or more embodiments of the present invention.

FIG. 1 is a block diagram showing the configuration of a principal part in a DVD player 1 according to one or more embodiments of the present invention.

As shown in FIG. 1, the DVD player (character string detection device/image processing device) 1 according to one or more embodiments of the present invention includes a control unit 10, a storage unit 11, a display unit 12, an operation unit 13, a temporary storage unit 14, and a bus 15 that serves as a common signal wire used for transmission and reception of data at each of these units.

The display unit 12 displays an image processed by the DVD player 1 and displays an operation screen for a user to operate the DVD player 1 as a graphical user interface (GUI) screen. The display unit 12 is configured by a display device such as a liquid crystal display (LCD) and an organic EL display.

The operation unit 13 is for a user to input a command signal to operate the DVD player 1.

The DVD player 1 can include the display unit 12 and the operation unit 13 each of which is capable of directly transmitting and receiving data via the bus 15, but is not limited to this configuration.

In one or more embodiments of the present invention, the display unit 12 is provided as a digital television. The DVD player 1 has an external interface (not shown) that is connected with the control unit 10 via the bus 15 and is connected with the display unit 12 as the digital television via a high definition multimedia interface (HDMI) terminal and a HDMI cable. The DVD player 1 is thus capable of outputting, to the display unit 12 (digital television), an image reproduced by itself to display the same.

In one or more embodiments of the present invention, the operation unit 13 can be provided as, for example, a common remote controller for the digital television and the DVD player 1. A signal corresponding to each of buttons (such as a directional keypad, a decision key, and character input keys) provided at the operation unit 13 is outputted as an infrared signal from a light emitting unit of the operation unit 13 when the button is pressed down, and is transmitted to the DVD player 1 or the digital television via a light receiving unit provided at the DVD player 1 or a main body of the digital television. The signal received via the light receiving unit (not shown) of the DVD player 1 is supplied via the bus 15 to the control unit 10, and the control unit 10 performs behavior according to the signal.

The control unit 10 executes a program read out of the storage unit 11 to the temporary storage unit 14 so as to perform various calculations and perform overall control on each unit included in the DVD player 1 via the bus 15.

In one or more embodiments of the present invention, the control unit 10 includes, as functional blocks, a feature value extraction unit 22, a primary detection unit 23, a candidate region specification unit 24, a pixel plot unit 25, a clustering unit 26, a representative color deciding unit 27, a cluster selection unit 28, a clipping unit 29, a secondary detection unit 30, and a character string determination unit 31. These functional blocks each cause the DVD player 1 to function as the character string detection device according to one or more embodiments of the present invention.

The DVD player 1 is an image processing device, so that the control unit 10 includes, as functional blocks causing the DVD player 1 to function as the image processing device, a video reproduction unit 20 and a still image generation unit 21. These configurations exemplify the basic functional blocks included in the image processing device, does not limit the configuration of the character string detection device according to one or more embodiments of the present invention, and are designed appropriately in accordance with the functions of the image processing device.

The above functional blocks (20 to 31) in the control unit 10 are each embodied by a central processing unit (CPU) reading out a program stored in a storage device embodied by such as a read only memory (ROM) to the temporary storage unit 14 embodied by such as a random access memory (RAM) and executing the program.

In the above functional blocks, the feature value extraction unit 22, the primary detection unit 23, and the candidate region specification unit 24 each achieve a primary detection function of the character string detection device according to one or more embodiments of the present invention. The pixel plot unit 25, the clustering unit 26, and the representative color deciding unit 27 each achieve a color analysis function. The cluster selection unit 28, the clipping unit 29, and the secondary detection unit 30 each achieve a secondary detection function.

The DVD player 1 according to one or more embodiments of the present invention can be further equipped with a character evaluation device (not shown). The character evaluation device has a character evaluation function for analyzing and evaluating any character that can be detected by the character string detection device according to one or more embodiments of the present invention. The character string detection device is thus capable of detecting a character string included in an image with use of information on the character obtained through evaluation by the character evaluation device. More specifically, the character evaluation device analyzes the character based on a character shape property and a character linguistic property and evaluates in terms of how hard the character is detected incorrectly (how easily the character is detected correctly), to obtain an evaluation value indicating "less likelihood of incorrect detection". The evaluation value for each character is preliminarily stored in a character information storage unit (not shown).

The character string detection device is capable of preliminarily grasping less likelihood of incorrect detection for each character on the basis of the evaluation value obtained by the character evaluation device. The character string detection device is thus capable of retrieving characters in order of less likelihood of incorrect detection in a designated keyword, to achieve character string detection processing more accurately and efficiently as compared with the conventional art.

Incorrect detection herein includes cases where a target character is incorrectly detected in a background region that originally includes no character, where a different character is incorrectly detected as the target character, where the target character fails to be detected although the target character is originally included, and the like. Such incorrect detection tends to occur if a character has a simple shape or there is another character of a different notation. For example, incorrect detection occurs with higher possibility when a character has a shape having a less feature as a character (e.g. "1" as a numeric character and "―" as a character representing prolonged sound), when a character is often used as part of constituents of various characters like a radical of a Chinese character (e.g. "口" and "日"), when different characters have shapes similar to each other (e.g. "ニ" as a katakana character and "二" as a Chinese numeral, "ロ" as a katakana character and "口" as a Chinese character, and "つ" as a normal character and "っ" as a character representing a double consonant), and in contrast, when a plurality of characters of different notations have a same meaning (e.g. "沢" and "澤" and "A" and "a").

It is thus recognized that "less likelihood of incorrect detection" can be evaluated if a character has a complex shape, there is no other character having a similar shape, there is no other character of a different notation, and the like. Not being limited to the above, less likelihood of incorrect detection can be alternatively evaluated in accordance with a different feature of the character shape or a different character property.

The storage unit 11 stores a control program executed by the control unit 10, an OS program, and various pieces of fixed data to be read out when the control unit 10 executes any one of the various functions (such as an image processing function, the primary detection function, the color analysis function, the secondary detection function, and the character evaluation function) of the DVD player 1. In one or more embodiments of the present invention, the storage unit 11 includes an image storage unit 40, a keyword storage unit 41, and a character information storage unit 42, for example, to store various pieces of fixed data. The storage unit 11 is embodied as a nonvolatile memory that stores a rewritable content, like an erasable ROM (EPROM), an electrically EPROM (EEPROM), or a flash memory. As described above, the storage unit used for storing information including a content that does not need to be rewritten can be embodied separately from the storage unit 11 as a read only semiconductor memory like a read only memory (ROM) (not shown).

The image storage unit 40 stores data of a target image to be processed by the DVD player 1 serving as the image processing device. In one or more embodiments of the present invention, the image storage unit 40 is capable of storing both a still image and a video image as images.

The keyword storage unit 41 stores a keyword designated by a user. The character string detection device executes character string detection processing (inclusive of a series of the primary detection function, the color analysis function, and the secondary detection function) in order to detect the designated keyword in the image. In this case, each unit in the control unit 10 references to the keyword storage unit 41 and reads out the designated keyword. The keyword storage unit 41 is to be detailed later in terms of its data structure.

The character information storage unit 42 stores, as a database, information on characters to be used when the character string detection device executes character string detection processing. The character database stored in the character information storage unit 42 includes a character code used for uniquely distinguishing a character, and feature information (model) on the character in correspondence therewith for each of the characters. The character database is to be detailed later in terms of its data structure.

The temporary storage unit 14 is a so-called working memory that temporarily stores data used for a calculation, a calculation result, and the like in the course of various processing behaviors executed by the DVD player 1, and is embodied as a random access memory (RAM) or the like. More specifically, upon execution of image processing, the still image generation unit 21 develops a processing target image in an image memory (not shown) included in the temporary storage unit 14, so that each unit in the control unit 10 is capable of analyzing the image in detail for each pixel. Otherwise, the temporary storage unit 14 temporarily stores also a result of execution by each unit that achieves the primary detection function, the color analysis function, and the secondary detection function.

Figure 2:
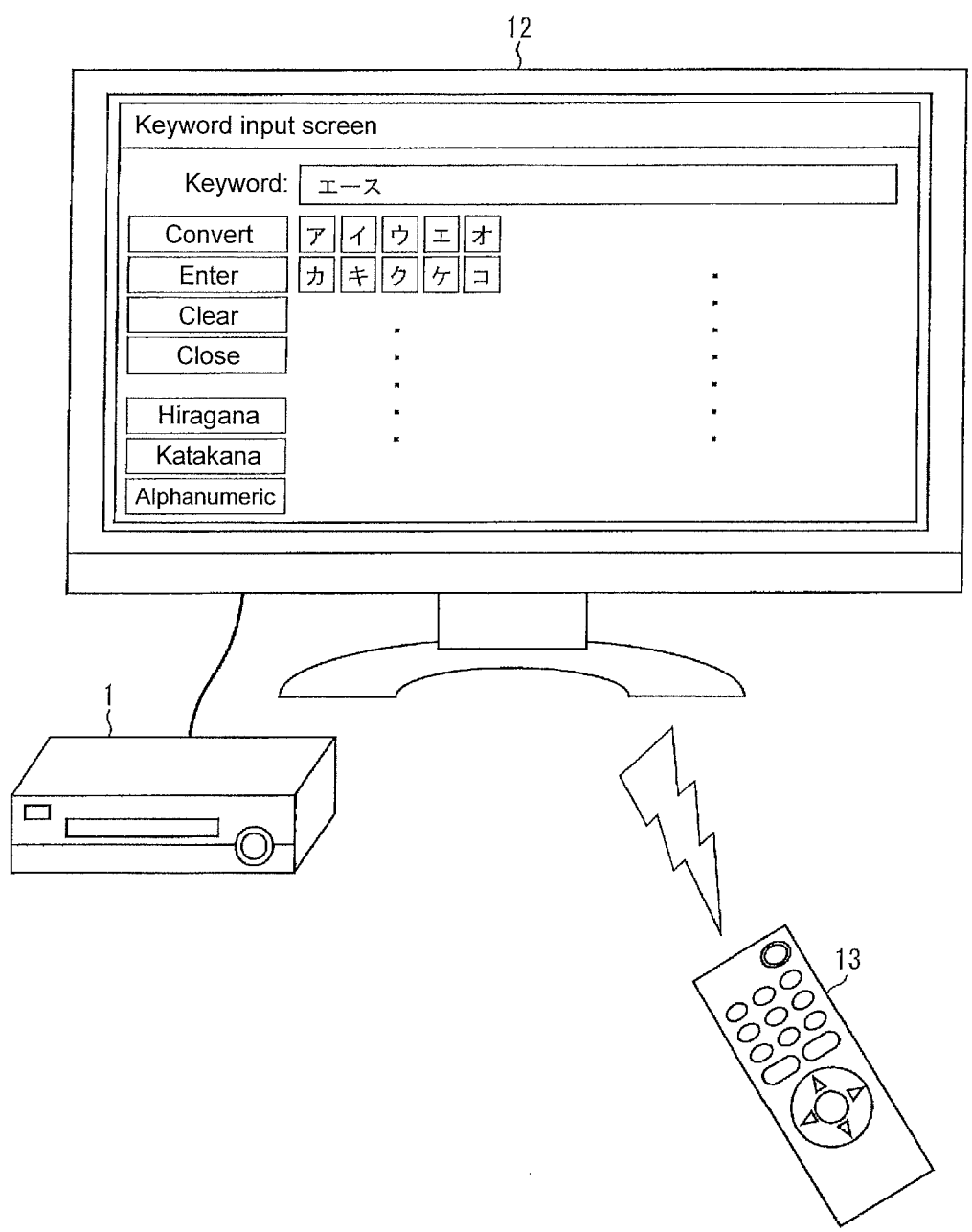
FIG. 2 is a view of outer appearance of a character string detection device (image processing device/DVD player), a display unit (digital television), and an operation unit (remote controller) according to one or more embodiments of the present invention, for illustrating a state where a user inputs a target character string.

FIG. 2 is a view of outer appearance of the DVD player 1, the display unit 12 (digital television), and the operation unit 13 (remote controller) according to one or more embodiments of the present invention, for illustrating a state where a user inputs a target keyword (character string). In the example shown in FIG. 2, the DVD player 1 outputs, to the display unit 12, the operation screen used by a user operating the character string detection device, so that the display unit 12 displays the operation screen. In the example shown in FIG. 2, the display unit 12 displays the GUI screen that allows a user to input a character string to be retrieved by operating the operation unit 13.

A user operates the operation unit 13 to input, to the character string detection device, a character string to be found in a processing target video image (or still image). FIG. 2 shows the case where a keyword "エース" is inputted as a target character string.

In an exemplary case where a user operates the operation unit 13 to input a keyword and a decision button or the like of the operation unit 13 is pressed down, an input control unit (not shown) of the DVD player 1 receives the inputted keyword (such as "エース") and causes the keyword to be stored in the keyword storage unit 41.

Figures 3, 4:
FIG. 3 is a chart exemplifying the data structure of a keyword held in a keyword storage unit 41 of the character string detection device.
FIG. 4 is a view exemplifying a still image generated by a still image generation unit of the character string detection device according to one or more embodiments of the present invention.

FIG. 3 is a chart exemplifying the data structure of the keyword stored in the keyword storage unit 41. As shown in FIG. 3, a display control unit stores respective characters in the obtained keyword in order of appearance in the keyword. For example, if the keyword is "エース", the display control unit stores the character "エ" since it is the first character in this keyword, as well as information on the character order "1" in correspondence with this character. The characters "ー" and "ス" are similarly stored in correspondence with the character orders "2" and "3", respectively.

According to one or more embodiments of the present invention, the DVD player 1 includes the character evaluation device, the character evaluation device evaluates the three characters "エ", "ー", and "ス" to assign priority ranks or retrieval orders in order of "less likelihood of incorrect detection". It is assumed in the example shown in FIG. 3 that, out of the three characters, "ス", which is most hard to be recognized incorrectly as a different character, is decided to have the priority rank "1", "エ", which is possibly recognized incorrectly as a different character, is decided to have the priority rank "2", and "ー", which is highly possibly recognized incorrectly as a different graphic or character, is decided to have the priority rank "3".

When the decided priority ranks are stored in correspondence with the respective inputted characters as shown in FIG. 3, the primary detection unit 23 and the secondary detection unit 30 are capable of detecting the characters based on the priority ranks. In this case, the characters are reliably detected in order of less likelihood of incorrect recognition, thereby enabling detection of designated characters accurately and efficiently.

As shown in FIG. 3, in the keyword storage unit 41, an already detected character can be further provided with a field storing a flag indicative of "detected".

[Functional Configuration of DVD Player 1]

The video reproduction unit 20 in the control unit 10 reads out a video image stored in the image storage unit 40, applies processing for external output, and reproduces the video image.

Upon input of a command to reproduce and display the video image, the video image processed by the video reproduction unit 20 is temporarily stored in an image memory (not shown) and is outputted to the display unit 12 under the control of the display control unit (not shown) for each frame.

Upon input of a command to detect a predetermined character string in the video image, the video image processed by the video reproduction unit 20 is outputted to the still image generation unit 21.

Upon input of a command to display a still image stored in the image storage unit 40, the display control unit reads the still image out of the image storage unit 40 and outputs to the display unit 12.

The still image generation unit 21 extracts a target frame on which character string detection processing is executed, from the respective frames of the video image and generates a processing target still image. The still image generation unit 21 can generate each still image from all of the frames included in the video image. In one or more embodiments of the present invention, however, processing target still images are extracted at intervals of predetermined seconds or predetermined frames.

Upon input of a command to detect a predetermined character string in a still image, the display control unit (not shown) reads a designated still image from the image storage unit 40 and outputs to the feature value extraction unit 22.

The feature value extraction unit 22 extracts a feature value used for character string detection processing from the still image generated by the still image generation unit 21 or the still image read out by the display control unit. The feature value used by the character string detection device according to one or more embodiments of the present invention is not limited as long as the character string detection device is capable of distinguishing the shape of each of the characters.

It is noted that the primary detection unit 23 and the secondary detection unit 30 compare the feature value with a given model feature value to achieve detection of a character. Therefore, according to one or more embodiments of the present invention, the model feature value for each character stored in the character information storage unit 42 and the character feature value extracted by the feature value extraction unit 22 are extracted in a same manner and be of a same type. As a technique for detecting character feature value in an image, the corner detection technique or the outline (edge) detection technique described in Non-Patent Document 1, for example, may be assumed to be used, although the feature value extraction unit 22 is not limited thereto in terms of its configuration. The character feature value can be alternatively a character image.

Figure 5:
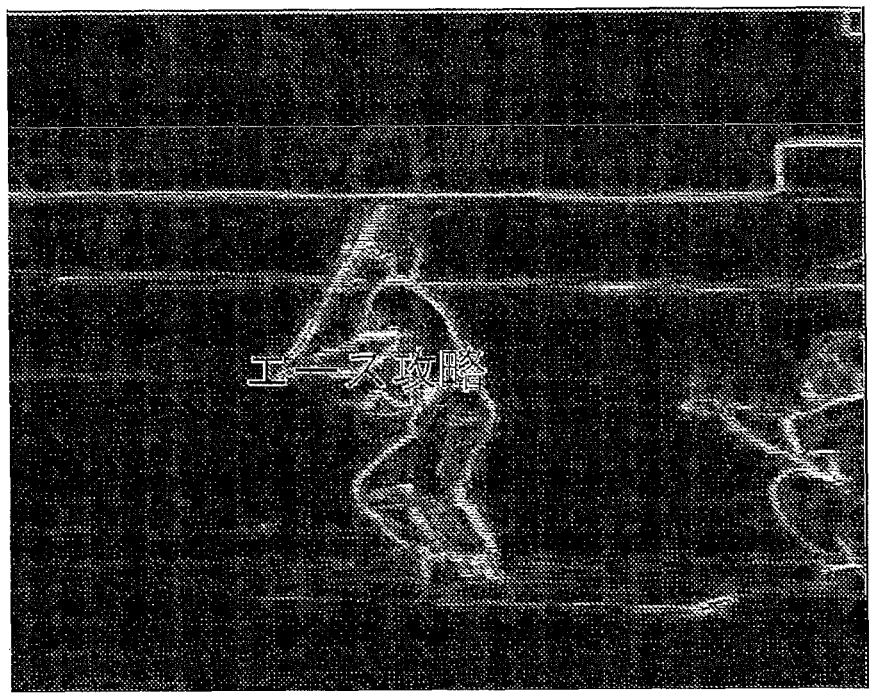
FIG. 5 is a view exemplifying feature value data reflecting a feature value extracted by a feature value extraction unit from the still image generated by the still image generation unit.

FIG. 4 is a view exemplifying a still image generated by the still image generation unit 21. FIG. 5 is a view exemplifying feature value data reflecting a feature value extracted by the feature value extraction unit 22 from the still image generated by the still image generation unit 21. One or more embodiments of the present invention exemplifies a case where the feature value extraction unit 22 obtains binary edge feature value data representing a region (edge) having sharp color variation and a region having no sharp color variation based on each pixel value of the still image shown in FIG. 4, using the outline detection technique or the like.

The feature value extraction unit 22 supplies the edge feature value data obtained as shown in FIG. 5 to the primary detection unit 23.

The primary detection unit 23 judges whether or not the designated keyword is included in the image through a relatively easy process (low-load processing). The primary detection function achieved by the primary detection unit 23 is performed in order to quickly judge through low-load processing that "the image does not include the designated keyword" or "the image highly possibly includes the designated keyword". In one or more embodiments of the present invention, the primary detection unit 23 thus judges whether or not the image possibly includes at least one character in the designated keyword.

More specifically, the primary detection unit 23 compares the feature value data extracted by the feature value extraction unit 22 with feature information (model) of one character in the designated keyword to detect a region that includes a feature of "ス" in the feature value data. According to one or more embodiments of the present invention, the primary detection unit 23 detects the character "ス" of the first priority rank in the designated keyword "エース", for example. If there is no possibility of including "ス", which is hardest to be incorrectly detected in "エース", it is possible to accurately judge that "the image does not include the designated keyword". It is thus adequate to apply detection processing only on one character of the first priority rank in order to achieve the purpose of the primary detection function.

In one or more embodiments of the present invention, the character information storage unit 42 stores models for respective characters.

FIG. 6 is a chart exemplifying a character database stored in the character information storage unit 42 in the DVD player 1 according to one or more embodiments of the present invention.

The character information storage unit 42 stores a character code used for uniquely distinguishing a character, and feature information (model) on the character in correspondence therewith for each of the characters. In one or more embodiments of the present invention, a primary model used with the primary detection function of low-load processing and a secondary model used with the secondary detection function for more accurate character string detection are associated for one character. The primary detection unit 23 detects a target character in the feature value data with use of the primary model stored in the character information storage unit 42 in order to perform primary detection of low-load processing.

The primary model has information of a quantity smaller than that of the secondary model, thereby enabling the primary detection unit 23 to perform character detection processing through relatively low-load processing. More specifically, unlike the secondary model, the primary model has a less number of pieces of information (black dots) that designate expected positions of edges in the character. The primary model does not include pieces of information (white circles) that designate unexpected positions of edges.

As described above, the primary detection unit 23 uses the primary model having conditions fewer than those of the secondary model, so that the primary detection unit 23 performs character detection with a low processing load, while such character detection is rough processing with less accuracy. In practice, a character other than the target character is possibly detected as a possible target character. Such character detection with a smaller number of features (fewer conditions) can reduce failing to detect, although included in an image, a target character. The primary model is thus configured appropriately for the purpose of the primary detection.

Figure 7:
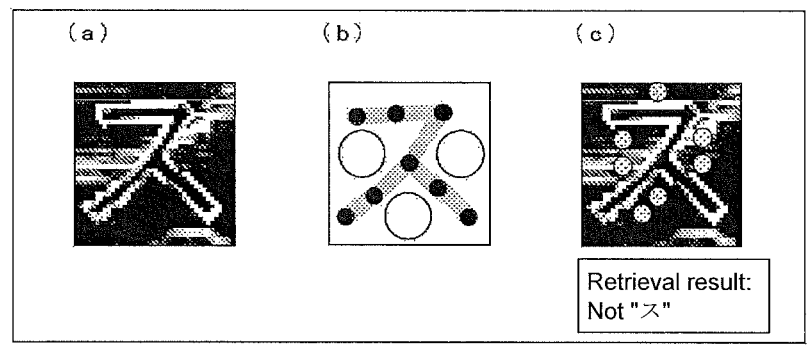
FIGS. 7(a) to 7(c) are views illustrating character recognition in an image including a complex background.

FIGS. 7(*a*) to 7(*c*) are views illustrating character recognition in an image including a complex background.

When a character (such as "ス") is superimposed on a complex background as shown in FIG. 7(*a*), an edge other than edges configuring the character "ス" is occasionally detected in the background of the character "ス". The following harmful effect is caused by initially comparing with the secondary model in order to detect the character "ス" in this image. That is, as shown in FIG. 7(*b*), the secondary model includes pieces of information (white circles) that designate unexpected positions of edges. On the other hand, as shown in FIG. 7(*c*), there are detected edges around the character "ス" in the complex background, where there are expected no edges in the model (circles filled with halftone dots). Use of the secondary model thus causes an adverse affect that edges are detected in the background of the image shown in FIG. 7(*a*) which should originally include the character "ス", and outputted as a result is an incorrect retrieval result indicating that no "ス" is included.

As described above, the primary detection function achieved by the primary detection unit 23, however, uses the primary model having fewer conditions to quickly judge possibility of including "ス", thereby avoiding failing to detect "ス".

The primary detection function is performed in order to find possibility of including a designated keyword. Incorrect detection to some extent accordingly is acceptable. Therefore, according to one or more embodiments of the present invention, simplifying its processing rather than the secondary detection function to be described later may be preferred in terms of processing efficiency. For the above reason, the primary model having features fewer than those of the secondary model is used to determine whether or not a detection target character is included.

The primary detection function is applied to the entire image because the position of the designated keyword in the image is absolutely unknown upon execution of the primary detection function. As described above, simplification of processing of the primary detection function leads to a large effect of reduction in processing time. The effect of processing efficiency is enhanced particularly when the image is large in size like an image of a full HD size (1920 pixels×1080 pixels).

The character database shown in FIG. 6 can preliminarily store a priority index indicating "less likelihood of incorrect detection" for each character. In the example shown in FIG. 6, a character having a larger priority index is harder to be detected incorrectly. This priority index is preliminarily obtained by the aforementioned character evaluation device (not shown). The primary detection unit 23 is accordingly capable of grasping the priority rank of each character in the designated keyword and capable of judging to perform detection of characters on from higher priority ranks.

Figure 8:
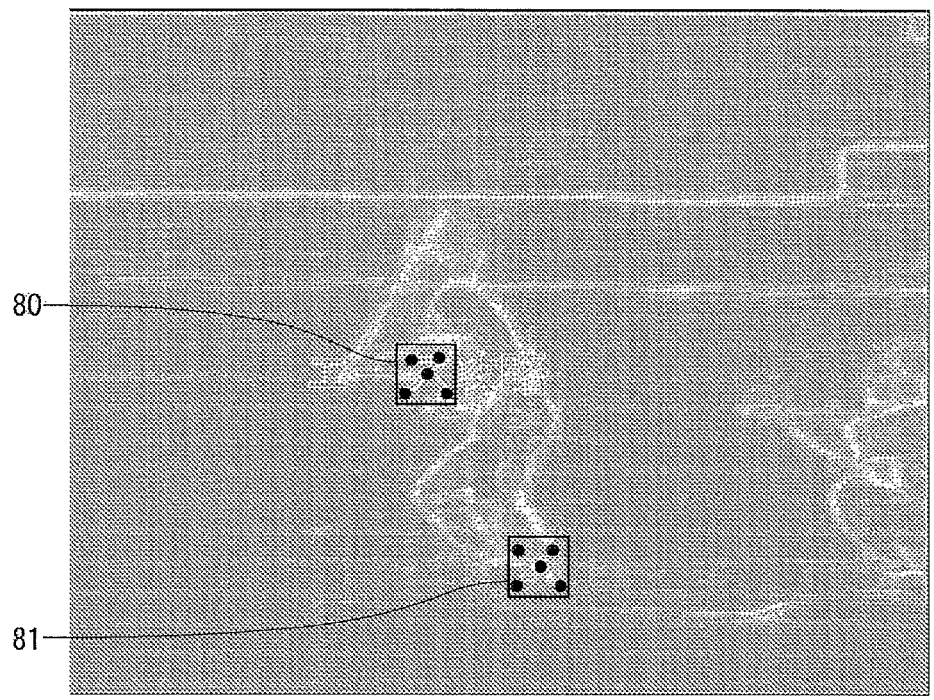
FIG. 8 is a view exemplifying a result of applying a primary detection function to feature value data by a primary detection unit in the character string detection device according to one or more embodiments of the present invention.

FIG. 8 is a view exemplifying a result of applying the primary detection function to the feature value data by the primary detection unit 23.

The primary detection unit 23 obtains the primary model of "ス" stored in the character information storage unit 42 and judges whether or not the feature value data (FIG. 5) includes at least one region having a feature matching that of the obtained primary model, in other words, a character 'similar to' "ス". If the character 'similar to' "ス" (candidate character) is not detected in the feature value data, the primary detection unit 23 is capable of judging that "the image does not include the designated keyword (エース)". If the candidate character is detected, the primary detection unit 23 is capable of judging that "the image highly possibly includes the designated keyword".

For example, as shown in FIG. 8, the primary detection unit 23 compares the primary model of "ス" and the feature value data shown in FIG. 5 to detect a candidate character position 80 and a candidate character position 81 of a candidate character matching the primary model of "ス".

The primary detection unit 23 supplies information on the detected candidate character positions to the candidate region specification unit 24. If no candidate character position is specified, this image is judged to include no character "ス". The character string determination unit 31 for finally determining the character string is thus capable of outputting a final determination result that "this image does not include エース".

The candidate region specification unit 24 specifies a candidate region that highly possibly includes the designated keyword ("エース" in this case) in accordance with the candidate character positions of the character 'similar to' "ス" detected by the primary detection unit 23.

Figure 9:
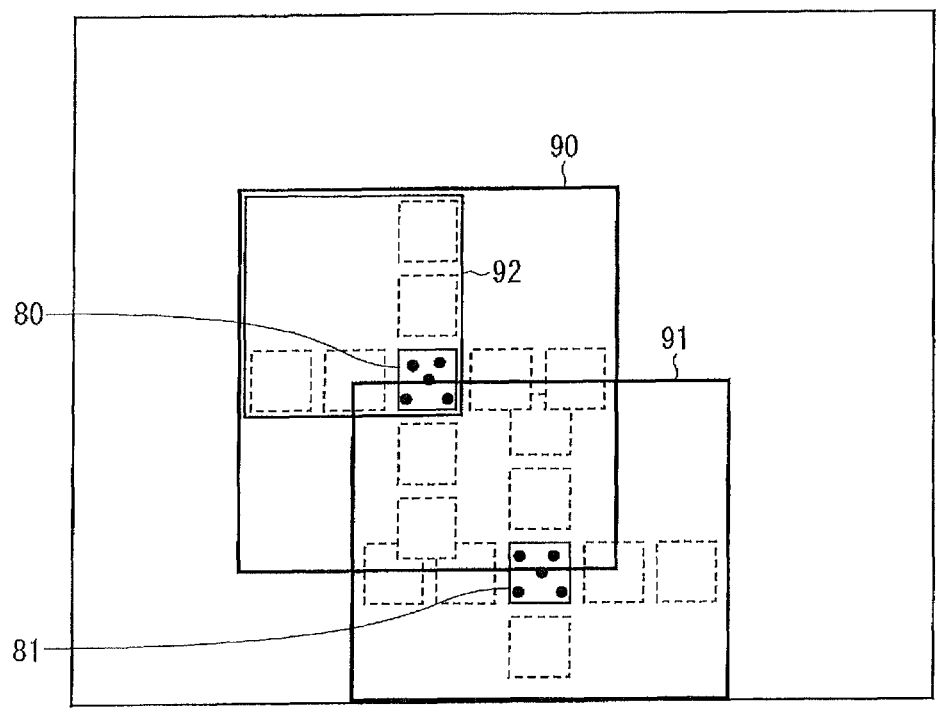
FIG. 9 is a diagram exemplifying a result of specifying candidate regions based on candidate character positions by a candidate region specification unit in the character string detection device according to one or more embodiments of the present invention.

FIG. 9 is a diagram exemplifying a result of specifying candidate regions based on the candidate character positions by the candidate region specification unit 24.

In one or more embodiments of the present invention, when the primary detection unit 23 specifies a candidate character position of the character 'similar to' "ス", the candidate region specification unit 24 assumes that "ス" is included therein, estimates how the designated keyword "エース" can be located, and specifies a candidate region embracing the locations.

For example, the candidate region specification unit 24 specifies a candidate region 90 covering regions for two characters next to the candidate character position 80 in upper, lower, left, and right directions, in consideration that characters are aligned vertically or horizontally in a line and that the character "ス" appears as the third character in the designated keyword "エース". If there is a character "ス" at the candidate character position 80 and this character "ス" configures the designated keyword "エース", the characters "エ" and "ー" are highly possibly included in the candidate region 90. By executing the secondary detection function for detecting the character string "エース" in the candidate region 90, it is possible to detect the target character string with high probability and low throughput.

If the primary detection unit 23 specifies a plurality of candidate character positions, the candidate region specification unit 24 similarly specifies a candidate region 91 for the second candidate character position 81, and so on.

The candidate region specification unit 24 can further narrow the candidate region in accordance with a linguistic property of the designated keyword. For example, the designated keyword "エース" is of a Japanese language in which characters are read normally from left to write or from up to down except for special cases. The candidate region specification unit 24 can specify a candidate region 92 for the candidate character position 80 in consideration of this linguistic specification. It is thus possible to further narrow the candidate region.

As having been described, the candidate region specification unit 24 narrows the candidate region out of the regions possibly including the designated keyword in the entire image. Target regions of character string detection processing can be thus remarkably reduced in the subsequent steps. The configuration of the candidate region specification unit 24 thus largely contributes to increase in processing efficiency and reduction in processing load.

Upon detection of a letter 'similar to' "ス" with slanted, the candidate region specification unit 24 can specify a slant rectangle as a candidate region so as to match a slant candidate character position thus specified.

How the candidate region specification unit 24 specifies a candidate region is not limited to the above method. The candidate region specification unit 24 can specify a certain range with respect to the candidate character position regardless of the number of characters, or can define the candidate region in an appropriate shape such as a circle, an ellipse, or an oblong.

The above configuration enables execution of the primary detection function. It is possible to quickly judge through low-load processing whether or not a target character string is included. Furthermore, when the target character string is judged to be included, it is possible to narrow, in the entire image, a candidate region that highly possibly includes the target character string.

The candidate region specified by the candidate region specification unit 24 is subsequently supplied to each unit for executing the color analysis function (such as the pixel plot unit 25). The color analysis function is used to analyze the color of each pixel configuring the image. The result of the color analysis by the color analysis function is used by each unit for executing the secondary detection function so as to enable accurate and efficient execution of the secondary detection function of high-load processing.

Figure 10:
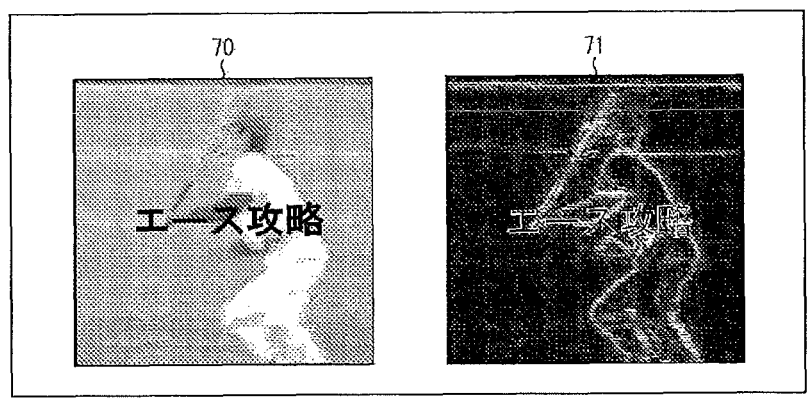
FIG. 10 includes views exemplifying results (a trimmed image and trimmed data) from trimming based on the candidate region specified by the candidate region specification unit.

FIG. 10 includes views exemplifying results of trimming based on the candidate region specified by the candidate region specification unit 24.

Each unit for performing the subsequent step processes the still image (in which each pixel has color information) and the feature value data. The candidate region specification unit 24 thus supplies to the pixel plot unit 25 a trimmed image 70 obtained by trimming the still image and trimmed data 71 obtained by trimming the feature value data.

The candidate region specification unit 24 can alternatively supply coordinate information on the candidate region to the pixel plot unit 25. In this case, the pixel plot unit 25 is capable of specifying the candidate region from the still image and the feature value data based on the coordinate information.

Each unit for performing the subsequent step has only to process trimmed information of a smaller size as shown in FIG. 10 instead of the entire image. This enables the subsequent processing to be executed accurately and efficiently.

The pixel plot unit 25 projects each pixel in the candidate region specified by the candidate region specification unit 24 in an arbitrary color space, whereby obtaining color distribution information on the candidate region. More specifically, the pixel plot unit 25 obtains color information on each pixel in the candidate region and specifies a coordinate position of the color information in a coordinate system in the color space, thereby to obtain coordinate information for each pixel.

Figure 11:
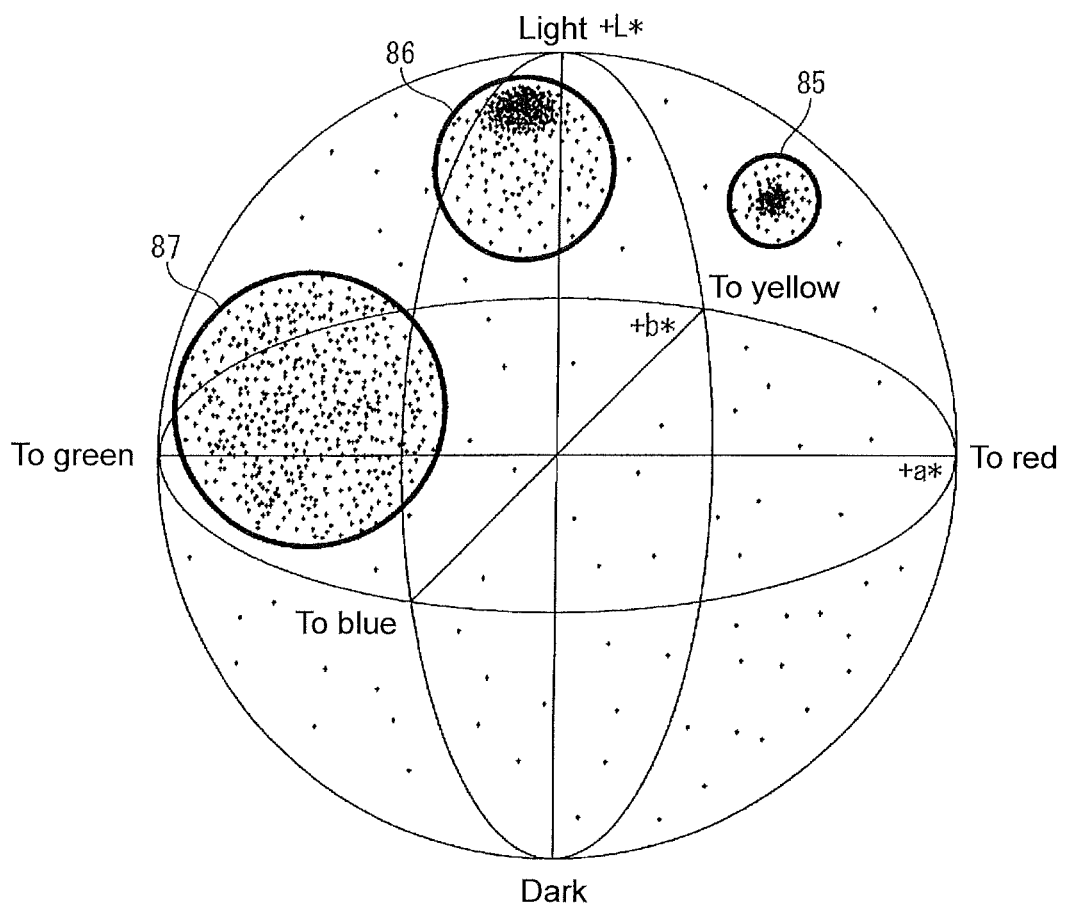
FIG. 11 is an image diagram of color distribution information obtained by a pixel plot unit plotting each pixel in the candidate region in a color space, in the character string detection device according to one or more embodiments of the present invention.

FIG. 11 is an image diagram of color distribution information obtained by the pixel plot unit 25 plotting each pixel of the candidate region in the color space. The color distribution information in FIG. 11 is illustrated for easy visual recognition, and the pixel plot unit 25 does not need to actually generate such an image diagram. Generating and outputting the image diagram in order to preliminarily present a color analysis result to a user is preferred for user's intuitive recognition of the color analysis result, according to one or more embodiments of the present invention.

In the example shown in FIG. 11, the pixel plot unit 25 plots (color information on) each pixel in a CIE-L*a*b* color space that is used as the arbitrary color space. According to one or more embodiments of the present invention, it is preferred to use the CIE-L*a*b* color space as the color space because the CIE-L*a*b* color space is recommended for standardization of a uniform perceived color space. The character string detection device according to the present invention is not limited to the above case, but can alternatively plot pixels in any known color space. Examples of such a color space include, for example a RGB color space, a CMY color space, and a HSB color space. Further alternatively, pixels can be plotted on a two-dimensional graph such as a CIE-xy chromaticity diagram instead of a three-dimensional space.

The pixel plot unit 25 plots each pixel in the color space to clarify color distribution in the candidate region. More particularly, it is possible to obtain "a location of concentrated points (pixels)", "concentration degree (dispersion) of points", and the like.

In this manner, the pixel plot unit 25 analyzes color distribution in the candidate region based on the color information on each pixel in the candidate region. The color distribution information on the candidate region generated by the pixel plot unit 25 is supplied to the clustering unit 26.

The clustering unit 26 defines a cluster for each group of pixels having similar colors as to respective pixels in the candidate region based on the color distribution information on the candidate region obtained by the pixel plot unit 25. In one or more embodiments of the present invention, for example, the clustering unit 26 initially divides the color space into several predetermined blocks and specifies some superordinate blocks that have more concentrated points. If the superordinate blocks having many points are adjacent to each other, these blocks can be grouped together. The clustering unit 26 then defines the central coordinate preliminarily defined for each block as the center of a sphere (cluster). In the grouped blocks, an average coordinate of the central coordinates of each block can be defined as the center of a sphere. The clustering unit 26 simulates while gradually increasing a radius r of the sphere from zero, and defines, as the radius r of the sphere, the radius r when the increase rate of the number of points in the sphere becomes not more than a certain rate. As a result, the center of the sphere and the radius r are defined, and the cluster is thus defined in the color space.

Accordingly defined are one or more clusters including pixel groups in which the distance between pixels is less than a first threshold (e.g. a diameter 2r of the sphere). In other words, clusters are each defined for concentrated pixels close to each other in the color space and having similar colors.

FIG. 11 exemplifies a case where the clustering unit 26 defines three clusters 85 to 87 in a space including concentrated points.

Information on the clusters defined by the clustering unit 26 (such as the central coordinate and the radius of the sphere) is supplied to the representative color deciding unit 27.

The representative color deciding unit 27 decides a representative color for each cluster generated by the clustering unit 26. There will be several methods of deciding the representative color. For example, the representative color deciding unit 27 decides an average value of all pieces of color information in a generated cluster as a representative color C of the cluster. Alternatively, the central coordinate of the cluster can be directly decided as the representative color.

At least one of the some clusters obtained is estimated to have pixels configuring a character string of a designated keyword belonging thereto. It is thus estimated that a color (or a similar color) of the character string is included in the representative color decided for each cluster.

When the clustering unit 26 generates a plurality of clusters, the cluster selection unit 28 evaluates likelihood of "a cluster including a pixel configuring a character string of a designated keyword", and selects a cluster that highly possibly includes the color of the character string.

The likelihood of a cluster having the color of the character string can be evaluated in the following manner, for example. A character, a graphic, or the like mostly has a single color, unlike a region including a natural background or an actual photographic subject. Color distribution in a cluster having a color of a character string is expected to have extremely smaller variation in comparison to other clusters. The cluster selection unit 28 thus obtains dispersion in each cluster, and selects clusters so that character string detection processing is applied in order of clusters having smaller dispersion. Alternatively, a processing order is assigned to each cluster.

Each unit for performing the subsequent step is thus capable of processing clusters in accordance with the orders defined by the cluster selection unit 28. Character string detection processing is applied in order of the clusters highly possibly having the color of the character string, thereby increasing efficiency of the character string detection processing.

The clipping unit 29 removes pixels in other regions so as to leave only regions of pixels belonging to the cluster selected by the cluster selection unit 28 in the candidate region.

Figure 12:
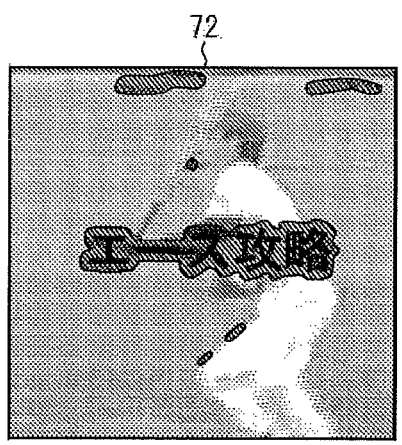
FIG. 12 is a view exemplifying map information indicating a clipped region specified by a clipping unit in the character string detection device according to one or more embodiments of the present invention.
Figure 13:
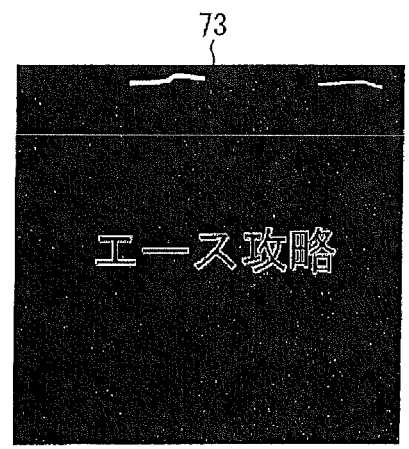
FIG. 13 is a view exemplifying clipped data having been clipped by the clipping unit based on the map information.

FIG. 12 is a view exemplifying map information indicating a clipped region specified by the clipping unit 29. FIG. 13 is a view exemplifying clipped data having been clipped based on the map information in FIG. 12.

FIG. 12 shows map information 72 obtained by the clipping unit 29 that specifies a region of pixels belonging to the cluster 85 in the candidate region (the trimmed image 70 in FIG. 10). In the map information 72, a shaded region indicates a region of the cluster 85 (to be left), and other regions are to be cut off.

The clipping unit 29 cuts off regions other than the shaded region in the map information 72 shown in FIG. 12 from trimmed data 71 shown in FIG. 10, thereby obtaining clipped data 73 as shown in FIG. 13, including only an edge feature based on the pixels in the cluster 85.

As described above, whichever the generated cluster is a cluster having the color of the retrieved character string. It is possible to mostly obtain an edge feature only of the color of the retrieved character string by individually processing the clusters categorized in accordance with colors.

Each unit for performing the subsequent step is capable of retrieving a character based on the clipped data 73 thus obtained and including no edge feature of any unnecessary color. Since information on the original complex background is cut off, character string detection is performed accurately with no adverse affect of the complex background.

The clipped data 73 generated by the clipping unit 29 is supplied to the secondary detection unit 30.

The secondary detection unit 30 judges whether or not the designated keyword is included in the image. More specifically, the secondary detection unit 30 compares the clipped data 73 generated by the clipping unit 29 with the model stored in the character information storage unit 42, so as to detect each character in the character string of the designated keyword.

The secondary detection function achieved by the secondary detection unit 30 needs to detect the designated keyword without incorrect detection. In one or more embodiments of the present invention, the secondary detection unit 30 compares the clipped data 73 with the secondary model (FIG. 6) that is stored in the character information storage unit 42 and includes more detailed information.

The secondary model includes a large amount of information for more accurate character string detection in comparison to the primary model. Although comparison with the secondary model including a large amount of information is high-load processing, the character string detection device according to one or more embodiments of the present invention has narrowed the processing range from the entire image to the shaded region shown in FIG. 12 in the former steps. It is thus possible to achieve accurate character string detection processing in short time.

According to one or more embodiments of the present invention, the secondary detection unit 30 detects the designated keyword by detecting each character in the target character string in accordance with the priority rank assigned to each character. For example, assume that the designated keyword is "エース" and priority ranks "2", "3", and "1" are respectively assigned to the three characters "エ", "ー", and "ス". In this case, the secondary detection unit 30 initially compares the secondary model of "ス" with the clipped data 73 to detect "ス", and then detects the characters "エ" and "ー" in this order in a similar manner.

As described above, the priority rank is decided based on "less likelihood of incorrect detection". The secondary detection unit 30 reliably detects the characters in order of less likelihood of incorrect detection, thereby achieving detection of designated characters accurately and efficiently. In one or more embodiments of the present invention, the priority rank is decided based on "less likelihood of incorrect detection" evaluated for each character by the character evaluation device (not shown). The present invention is, however, not limited to this case. Alternatively, it may be configured that a user designates the priority rank in accordance with own decision upon input of a keyword and set the same to the character string detection device.

According to one or more embodiments of the present invention, after succeeding in detection of at least one character, the secondary detection unit 30 estimates the positional relationship between characters based on alignment of the already detected character and a character to be detected, and narrows a detection target region to a region adjacent to the detected character, so as to execute character string detection processing.

More particularly, when the already detected character is an n-th character in the character string and the character to be detected subsequently is an (n+1)-th character in the character string, the secondary detection unit 30 is capable of further narrowing the detection target region. More specifically, the detection target region can be limited to regions of predetermined sizes on the right of and below the already detected character. If the character to be detected subsequently is an (n−1)-th character in the character string, the secondary detection unit 30 is capable of limiting to region of predetermined sizes on the left of and above the already detected character.

In the above configuration, it is possible to further narrow the retrieval range in comparison to the case of retrieving a target character sequentially in all the regions of the clipped data 73, thereby further reducing the processing time.

A specific example is described below. Assume that the secondary detection unit 30 detects the character "ス" of the first priority rank and then detects the character "エ". According to the character orders indicated in FIG. 3, the already detected character "ス" is the third, while "エ" to be detected subsequently is the first. Accordingly, "エ" is highly possibly located in the adjacent regions (particularly on the left or above in Japanese) of "ス".

Figure 14:
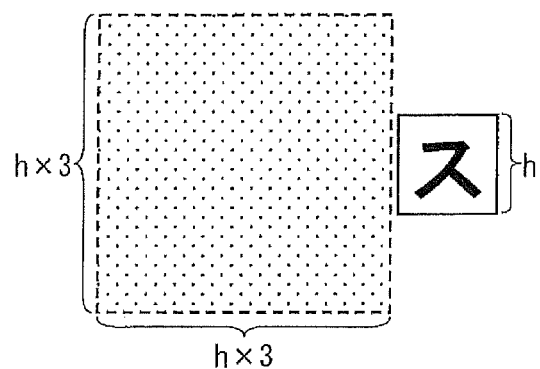
FIG. 14 is view exemplifying a detection target region that is decided based on a region of a detected character and is used for detecting a subsequent character.

The secondary detection unit 30 limits the retrieval target region of "エ" to the region adjacent to the already detected character "ス". As exemplified in FIG. 14, the retrieval target region is limited to a region of a predetermined size on the left of "ス" (the halftone dot region in the frame of broken lines). As exemplified in FIG. 14, if the region of the already detected character has the size of h×h, the predetermined size can be limited to a region of 3 h×3 h on the left of the region of the already detected character.

Figure 15:
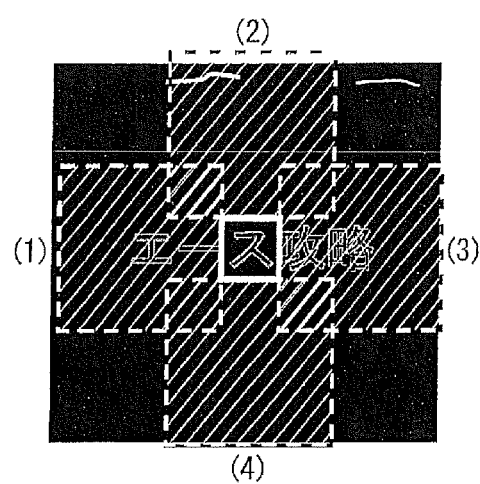
FIG. 15 is view showing a specific example of the detection target region that is decided based on the region of the detected character and is used for detecting the subsequent character.

In the example shown in FIG. 15, a target character (e.g. "エ") is detected in a region (1) on the left of the already detected character (e.g. "ス"). By limiting the detection target region in this manner, it is possible to detect the target character "エ" or "ー" with a much lower load in much shorter time in comparison to the case where the regions defined in the clipped data 73 are retrieved sequentially and categorically.

If the target character (e.g. "エ") is not found in the region (1) on the left of the already detected character (e.g. "ス"), the detection target region is sequentially expanded to an upper region (2), a right region (3), and a lower region (4), in order of higher possibility to be detected, to continue retrieval. If the target character is not still found, all the regions defined in the clipped data 73 are finally targeted to retrieve again.

The above configuration remarkably improves processing efficiency of character string detection processing by the secondary detection unit 30.

The secondary detection unit 30 can estimate the positional relationship and expand the detection target region in accordance with the positional relationship, as the distance between the already detected character and the character to be retrieved subsequently increases such that the character order of the character to be retrieved subsequently is an (n±2)-th, an (n±3)-th, an (n±4)-th, . . . from the n-th already detected character.

For example, assume that the designated keyword is "エース攻略", "略" is detected and "エ" is detected subsequently. When the region of the already detected character "略" has a size of h×h, the region to retrieve "エ" can be limited to a left region of a size of 5 h×5 h.

Even in this case, it is possible to remarkably limit an area of the detection target region so as to reduce the processing load and processing time, in comparison to the case of setting all the defined regions in the clipped data 73 as the detection target region.

Furthermore, the secondary detection unit 30 can detect a belt-like region including concentrated edges on the basis of the feature value obtained from the clipped data 73. If the belt region extends horizontally, the characters are highly possibly written horizontally. In this case, the secondary detection unit 30 can preferentially retrieve the left or right region rather than the upper or lower region. If the belt region extends vertically, the characters are highly possibly written vertically. In this case, the secondary detection unit 30 can preferentially retrieve the upper or lower region rather than the left or right region.

The above configuration further improves processing efficiency of the secondary detection unit 30.

As having been described, the secondary detection unit 30 detects each character in the designated keyword in accordance with the priority rank. As indicated in FIG. 3, when detecting a character in the designated keyword, the secondary detection unit 30 assigns to the detected character a detection completion flag corresponding thereto.

The character string determination unit 31 determines whether or not an image includes a designated keyword in accordance with the result of character detection by the secondary detection unit 30. In one or more embodiments of the present invention, the character string determination unit 31 references to the keyword storage unit 41 as indicated in FIG. 3, and judges that the designated keyword has been detected in the processed still image when detection completion flags are assigned to all the characters in the keyword.

When the secondary detection unit 30 has detected all the characters in the entire designated keyword, the character string determination unit 31 notifies a user of character string detection by displaying on the display unit 12 a success message informing that the character string is detected, for example. If the secondary detection unit 30 fails to detect all the characters in the designated keyword, the display unit 12 can display a failure message informing that the character string was not detected.

In a case where the still image in which the secondary detection unit 30 detected the character string is part of a video image, the character string determination unit 31 can notify a user of a reproduction position in the video image corresponding to the still image in which the character string is detected, in addition to the success message.

According to one or more embodiments of the present invention, the character string determination unit 31 further grasps the positional relationship between the individually detected characters and finally inspects whether or not the detected character string certainly corresponds to the designated keyword.

In one or more embodiments of the present invention, the characters in the designated keyword are individually detected not in order of appearance but in accordance with the priority ranks, e.g. in order of "ス", "エ", and "—". Each detected character may actually configure a word different from the designated keyword "エース". The character string determination unit 31 thus judges whether or not the detected characters "ス", "エ", and "—" are aligned in order of "エ", "—", and "ス" in a certain direction.

When the characters are aligned differently from "エース", such as "スエ—", the character string determination unit 31 judges that each detected character does not correspond to the characters in the designated keyword, and finally judges that the image does not include the designated keyword.

The character string determination unit 31 is capable of determining whether or not the designated keyword is included even in a case where respective characters in the designated keyword have different colors (enough to be categorized into different clusters).

For example, when pixels of each character "エ", "—", and "ス" belongs to different clusters in red, blue, and yellow, the secondary detection unit 30 is incapable of collectively detecting all the characters in one cluster. The secondary detection unit 30 individually detects "ス" in the yellow cluster, "エ" in the red cluster, and "—" in the blue cluster.

The character string determination unit 31 thus judges whether or not the characters "ス", "エ", and "—" detected in the different clusters are aligned in order of "エ", "—", and "ス" in a certain direction.

The character string determination unit 31 is capable of determining that the designated keyword "エース" is detected only when the aligned characters configure "エース".

[Character String Retrieval Processing Flow]

Figure 16:
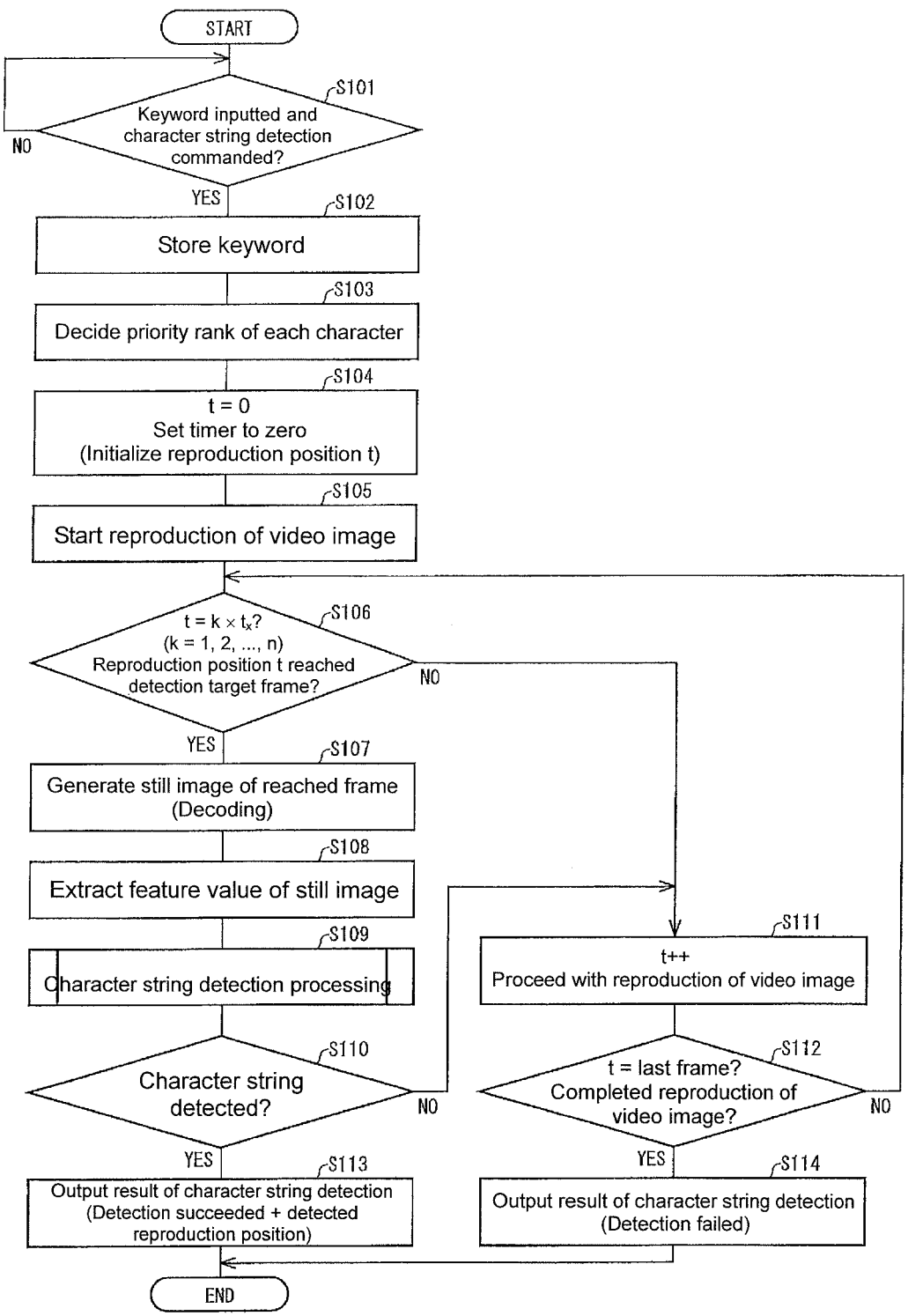
FIG. 16 is a flowchart showing a flow of image processing and character string detection processing in the DVD player.

FIG. 16 is a flowchart showing a flow of image processing and character string detection processing in the DVD player 1. Assume that the character string detection device included in the DVD player 1 retrieves a designated keyword in a video image and outputs a reproduction position where the target keyword is detected.

The character string detection device initially receives a command to detect a character string and a target character string to be retrieved (e.g. the keyword "エース"). The keyword can include one or more characters. A user can optionally designate a priority rank to each character. A video image to be processed can be further designated here.

When a keyword is inputted (YES in S101), the display control unit (not shown) stores the received keyword in the keyword storage unit 41 (S102). In this case, the display control unit stores, also in the keyword storage unit 41, character orders of the characters obtained in accordance with appearance of the characters so as to correspond respectively to the characters. When a user designates the priority ranks, the keyword storage unit 41 stores the priority ranks so as to correspond respectively to the characters. The assigned priority ranks can be decided by the character evaluation device (not shown) based on the priority indices of the characters indicated in FIG. 6, in other words, "less likelihood of incorrect detection" (S103).

The video reproduction unit 20 reads the designated video image out of the image storage unit 40, initializes a reproduction position t (set t to zero) (S104), and starts reproduction of the video image (S105).

In one or more embodiments of the present invention, in terms of processing efficiency, character string detection processing is not applied to all the frames in the video image. Instead, frames extracted every predetermined seconds (e.g. the interval of tx seconds) are designated as detection target frames.

The video reproduction unit 20 proceeds with reproduction of the video image until the reproduction position t reaches the detection target frame (NO in S106) (S111). Reproduction of the video image can proceed unless the reproduction position t reaches the last frame in the video image (NO in S112). When the reproduction position t moving ahead reaches the detection target frame (YES in S106), the still image generation unit 21 generates a still image of the reached detection target frame (decoding processing) (S107).

The feature value extraction unit 22 subsequently extracts a feature value from the generated still image (S108). The feature value can be information obtained in accordance with the corner detection technique or the outline (edge) detection technique described in Non-Patent Document 1. The character string detection device is capable of distinguishing a shape of a character on the basis of the information. In one or more embodiments of the present invention, there is generated feature value data shown in FIG. 5, for example.

Each of the units (23 to 31) subsequent to the feature value extraction unit 22 applies character string detection processing to the detection target frame (S109). For example, judged is whether or not the detection target frame includes the designated keyword "エース". The flow of character string detection processing will be detailed later with reference to FIG. 17. In S109, the character string determination unit 31 judges whether or not the designated keyword is detected in the detection target frame (S110).

If the character string of the designated keyword is detected in the detection target frame in the video image (YES in S110), the character string determination unit 31 outputs to the display unit 12 a success message informing that the keyword is detected successfully and a detected reproduction position corresponding to the frame in which the keyword is detected (S113).

To the contrary, if the character string of the designated keyword is not detected in the detection target frame (No in S110), the video reproduction unit 20 further proceeds with reproduction of the video image (S111). The video reproduction unit 20 is capable of proceeding with reproduction of the video image unless the reproduction position t reaches the last frame in the video image (NO in S112). When the reproduction position t reaches the subsequent detection target frame (YES in S106), character string detection processing described above is again applied to this detection target frame.

If the reproduction position t finally reaches the last frame and reproduction of the video image is completed without detection of the character string (NO in S110 and YES in S112), the character string determination unit 31 outputs a result of the character string detection processing. More specifically, if the designated keyword "エース" is never detected in the video image, the character string determination unit 31 outputs to the display unit 12 a failure message informing of failed detection (S114).

Character string detection can be optionally continued until the completion of reproduction of the video image even after succeeding in detection of the character string. In this case, the control unit 10 in the character string detection device can apply character string detection processing to the detection target frames after the frame in which the character string is detected, at the interval of predetermined seconds (t×seconds), to store a reproduction position of a frame in which the keyword "エース" is detected.

[Details of Character String Retrieval Processing Flow]

Figure 17:
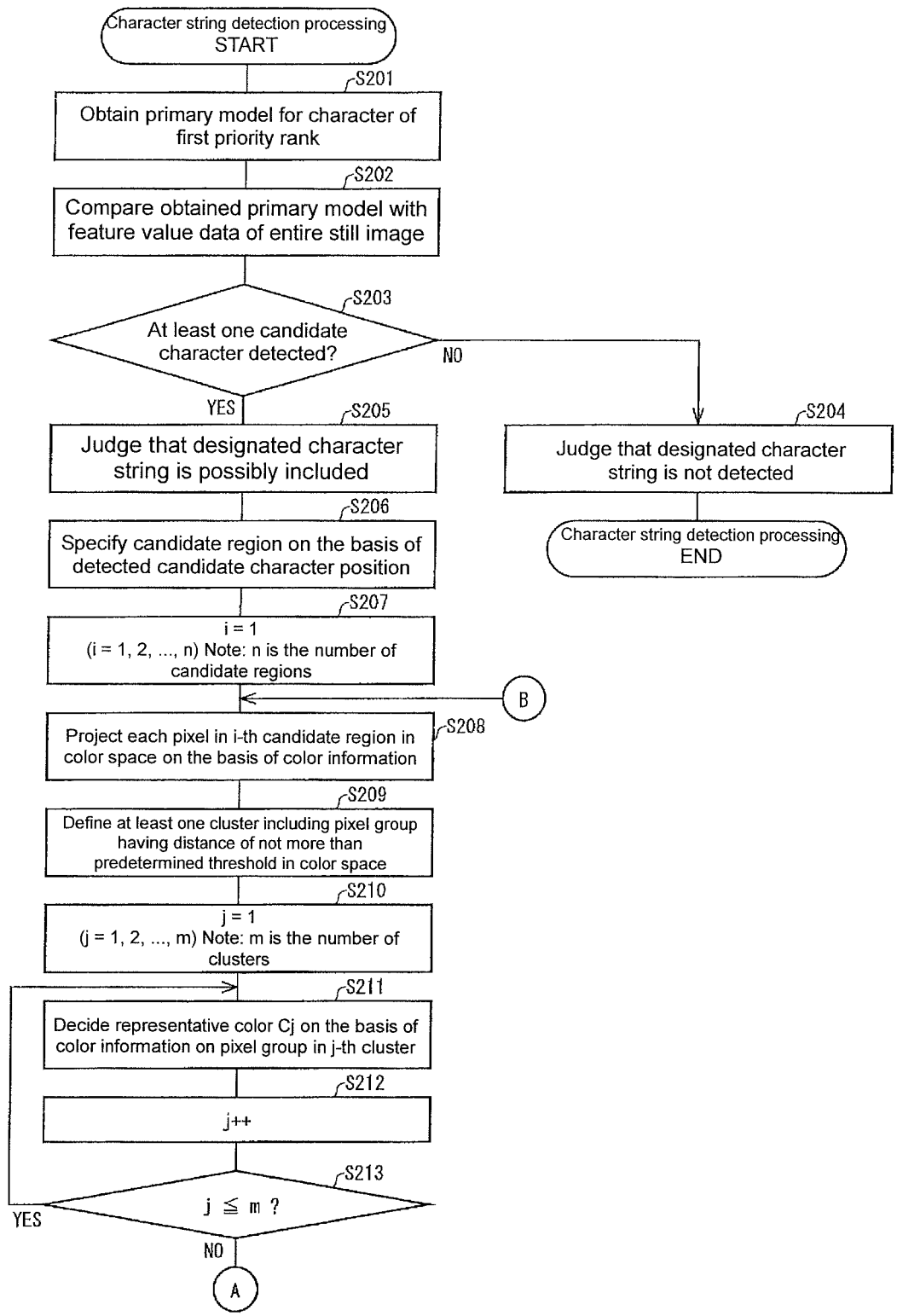
FIG. 17 is a flowchart showing a detailed flow of character string detection processing executed by the character string detection device of the DVD player.
Figure 18:
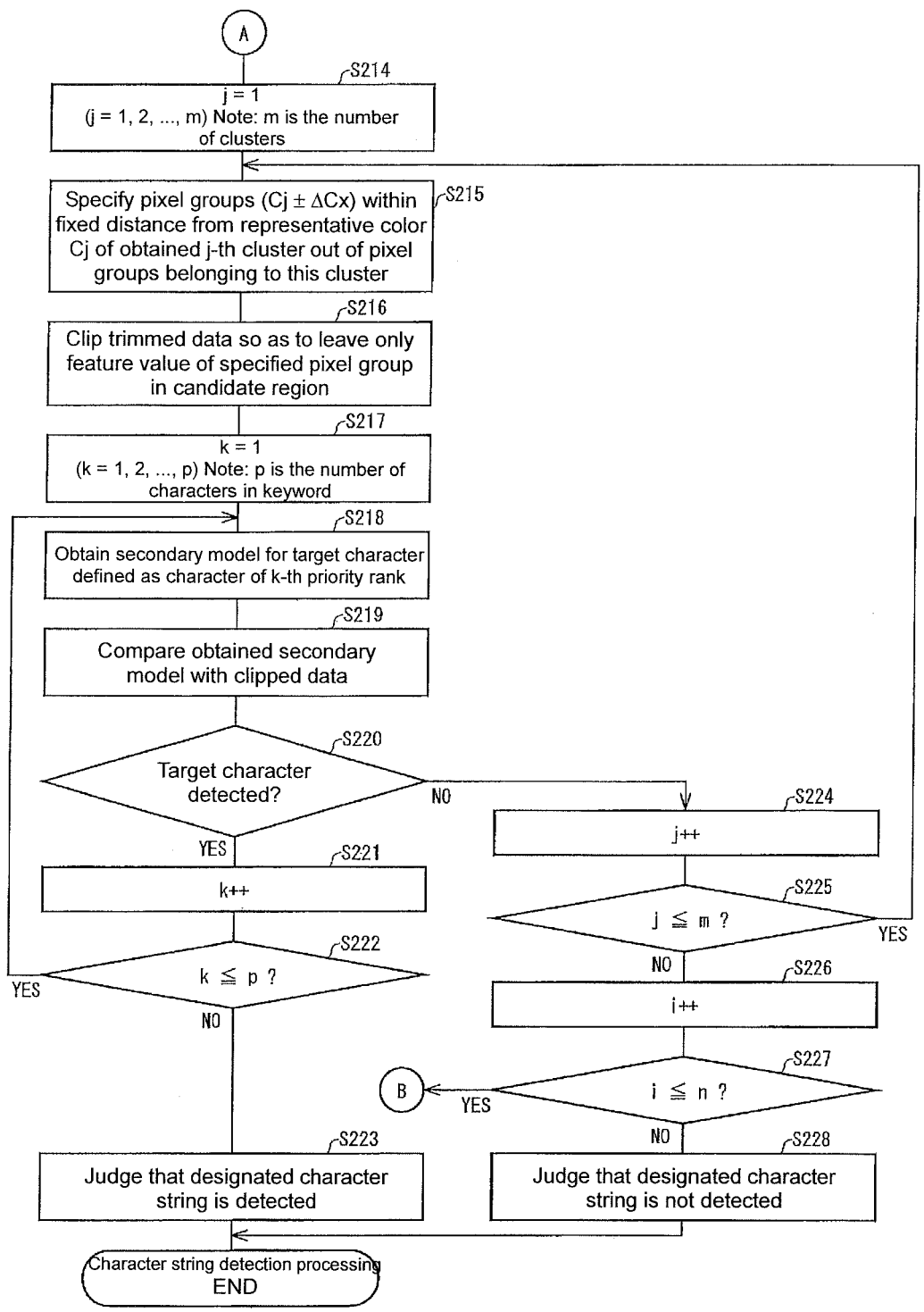
FIG. 18 is a flowchart showing a detailed flow of character string detection processing executed by the character string detection device of the DVD player.

FIGS. 17 and 18 are flowcharts showing the flow of character string detection processing executed by the character string detection device of the DVD player 1. In S108 in FIG. 16, if the feature value extraction unit 22 extracts feature value data (FIG. 5) of the detection target frame (still image), the control unit 10 in the character string detection device starts character string detection processing in S109.

The primary detection unit 23 initially references to the keyword storage unit 41 and obtains, as a target character, the character of the highest priority rank in the characters in the inputted keyword. In the example indicated in FIG. 3, the character "ス" is obtained as the target character. The primary detection unit 23 then references to the character information storage unit 42 and obtains the primary model of the character "ス" of the first priority rank (S201).

The primary detection unit 23 subsequently compares the feature value data (FIG. 5) extracted from the detection target frame with the primary model (FIG. 6) of "ス" stored in the character information storage unit 42, to detect the target character "ス" in the detection target frame (S202).

If the primary detection unit 23 judges that the detection target frame does not include the target character ("ス" in this case) (NO in S203), the primary detection unit 23 judges that "the designated keyword cannot be detected in this detection target frame", and outputs the judgment result to the character string determination unit 31 (S204). This completes the character string detection processing applied to this detection target frame. In contrast, if the primary detection unit 23 judges that the detection target frame includes the target character (YES in S203), the primary detection unit 23 judges that "this detection target frame possibly includes the designated keyword" (S205). The primary detection unit 23 specifies, as a candidate character, at least one character 'similar to' "ス" detected in the feature value data (e.g. the candidate character position 80 and the candidate character position 81 in FIG. 8). The specified candidate character position is supplied to the candidate region specification unit 24.

The candidate region specification unit 24 subsequently specifies a candidate region as a target region for detailed retrieval of the target character string based on the candidate character position specified by the primary detection unit 23 (S206). For example, there are specified the candidate region 90 and the candidate region 91 in FIG. 9. The candidate region specification unit 24 can specify one or more candidate regions.

Upon completion of the primary detection function from S201 to S206, the n candidate regions outputted from the candidate region specification unit 24 are provided to each unit for executing the color analysis function. A variable i is then initialized (S207), to start the color analysis function. The variable i is an integer varying from 1 to n, and n indicates the total number of the candidate regions specified by the candidate region specification unit 24.

The pixel plot unit 25 obtains an i-th candidate region (e.g. the trimmed image 70 in FIG. 10) and projects each pixel in this region in the color space based on the color information on each pixel (S208). The clustering unit 26 generates a cluster by defining concentrated pixels close to each other (having similar colors) in the color space as a sphere (a central coordinate and a radius) (S209). The clustering unit 26 can generate one or more clusters. As exemplified in FIG. 11, there are generated the clusters 85 to 87.

A variable j is then initialized (S210). The variable j is an integer varying from 1 to m, and m indicates the total number of the clusters generated by the clustering unit 26.

The representative color deciding unit 27 subsequently obtains a j-th cluster and decides a representative color of this cluster. In one or more embodiments of the present invention, the representative color deciding unit 27 decides, as a representative color Cj, an average value of pieces of color information on the pixels belonging to the cluster (S211). The representative color deciding unit 27 increments j by one upon decision of the representative color C for one cluster (S212), and repeats the processing in S211 if there is any unprocessed cluster (YES in S213). If the representative color deciding unit 27 decides the representative colors C for all the clusters (NO in S213), the control unit 10 shifts to execution of the secondary detection function. More specifically, each unit for executing the color analysis function provide, to each unit for executing the secondary detection function, information on each defined cluster (such as the central coordinate of the sphere, the radius of the sphere, the color distribution information on the sphere, and the coordinate of the representative color). The variable j is then initialized again (S214), to start the secondary detection function for each cluster.

The cluster selection unit 28 can then decide orders of processing the clusters based on dispersion of the clusters. For example, the cluster selection unit 28 decides the processing orders so as to process the clusters in order of smaller dispersion of pixels in each cluster.

The clipping unit 29 obtains the j-th cluster and specifies a region of a pixel group in this cluster (S215). The clipping unit 29 generates the map information 72 in FIG. 12, for example. The clipping unit 29 can then slightly expand the range from the pixel group belonging to the j-th cluster to pixel groups (Cj±ΔCx) within a fixed distance (ΔCx; second threshold) from the representative color Cj of this cluster, so as to expand the region left by clipping. It is thus possible to prevent a location originally having the target character string from being incorrectly judged to have no character string. The clipping unit 29 can further adjust the ΔCx value in accordance with the result of detection of the character string. If the character string is not detected, the clipping unit 29 can gradually increase the ΔCx value to expand the region left by clipping. Otherwise, when the character string is detected, it is possible to inspect whether or not the character string is reliably detected even if the ΔCx value is gradually decreased to reduce the region left by clipping.

The clipping unit 29 clips so as to leave only the specified pixel group in accordance with the generated map information 72 (S216). For example, the clipping processing of the clipping unit 29 refines the trimmed data 71 shown in FIG. 10 into the clipped data 73 shown in FIG. 13 from which unnecessary edge information on the complex background is cut off.

The secondary detection unit 30 subsequently applies secondary detection to the clipped data 73 obtained by the clipping unit 29 and judges whether or not the designated keyword is included. The secondary detection unit 30 starts with initialization of a variable k (S217) to execute comparison for each character. The variable k is an integer varying from 1 to p, and p indicates the number of characters included in the designated keyword. In one or more embodiments of the present invention, the secondary detection unit 30 executes secondary detection of the target character in accordance with the priority rank of the character.

The secondary detection unit 30 decides the character of a k-th priority rank as the target character to be detected, and obtains the secondary model (FIG. 6) of the target character from the character information storage unit 42 (S218). The secondary detection unit 30 then compares the obtained secondary model with the clipped data 73 (S219). If the secondary detection unit 30 finds a feature matching the feature of the target character in the clipped data 73 (YES in S220), the secondary detection unit 30 assigns a detection completion flag to this character (FIG. 3) and increments k by one (S221).

If there is unprocessed character (YES in S222), the secondary retrieval from S218 is repeated. In contrast, if all the characters are detected (YES in S220 and NO in S222), the secondary detection unit 30 judges that "the designated character string is detected" and outputs the judgment result to the character string determination unit 31 (S223). In this case, the locations of all the characters detected by the secondary detection unit 30 are considered and if the locations thereof do not correspond to the alignment of the characters in the designated keyword, the character string determination unit 31 can finally judge that the designated keyword is not detected even though the secondary detection unit 30 detects all the characters.

If no feature matching the feature of the target character is found in the clipped data 73 as the result of comparison in S 219 (NO in S220), the processing target cluster is considered not to be a cluster of the color of the character.

The cluster selection unit 28 increments j by one (S224). If there is any unprocessed cluster (YES in S225), the cluster selection unit 28 selects the cluster of which j has been incremented by one, and provides the selected cluster to the clipping unit 29. Accordingly, the processing from S 215 is applied again to a new cluster. If there is no unprocessed cluster (NO in S225), the target character string is not detected after detection processing in all the clusters in the candidate region.

Each unit for executing the color analysis function (such as the pixel plot unit 25) increments i by one (S226). If there is any unprocessed candidate region (YES in S227), the corresponding unit selects the candidate region of which i has been incremented by one and repeats the processing from S208. If there is no unprocessed candidate region (NO in S227), the target character string is not detected in all the candidate regions recognized in the still image. In this case, the secondary detection unit 30 judges that "the designated keyword is not detected in the detection target frame", and outputs the judgment result to the character string determination unit 31 (S228).

Based on the result outputted after the above character string detection processing, the character string determination unit 31 is capable of determining whether or not the designated keyword is detected in the detection target frame as shown in FIG. 16.

According to the configuration of the character string detection device and the character string detection method having been described, the character string detection device categorizes the detection target regions in the image for each pixel group having a similar color, and compares the feature value obtained for each similar color with the model of the target character.

At least one of the categorized clusters should have a color corresponding to the color of the character string. The feature value obtained from the cluster having the color of the character is assumed to indicate the feature value of the character itself including no excessive information. Use of the feature value obtained from the cluster having such color of the character achieves accurate comparison of the character with no influence of a complex background or a pattern.

Furthermore, the character string detection device according to one or more embodiments of the present invention is configured to include the primary detection unit 23 for easily performing quick comparison and the secondary detection unit 30 for performing detailed and accurate comparison.

In the above configuration, simple primary detection processing as low-load processing initially achieves quick judgment of either "a target still image does not include a designated keyword" or "a designated keyword is possibly included". In the case of judgment that "a target still image does not include a designated keyword", secondary detection processing as high-load processing is not applied to a still image that is expected not to include the designated keyword. It is thus possible to skip unnecessary processing and improve efficiency of the entire character string detection.

In the case of judgment that "a designated keyword is possibly included", the designated keyword is expected to be located around a region in which a candidate character 'similar to' a target character is detected. It is thus possible to narrow the target region of secondary detection in the entire still image based on the region in which the candidate character is detected. Secondary detection as high-load processing has only to be applied not to the entire still image but to the narrowed region that highly possibly includes the designated keyword. This leads to reduction in unnecessary processing and improvement in efficiency of the entire character string detection processing.

Furthermore, the character string detection device according to one or more embodiments of the present invention is capable of retrieving the characters in the designated keyword to be detected in order of less likelihood of incorrect detection. A character having less likelihood of incorrect detection is highly possibly detected correctly and quickly in a few candidates, in comparison to a character having more likelihood of incorrect detection. In comparison to the case of sequentially retrieving characters in a keyword in order of its alignment, it is possible to detect a target character string in an image more accurately and efficiently in short time through low-load processing.

Moreover, the character string detection device according to one or more embodiments of the present invention compares each character with use of the feature value of the corresponding character. This eliminates necessity of storing, as samples, character string images or feature values of a plurality of characters. In other words, there is no need to prepare both samples of horizontal writing and vertical writing, thereby reducing the memory in the character information storage unit 42. It is also advantageous in terms of processing time in comparison to a conventional configuration.

Modification Examples

The character string detection device according to one or more embodiments of the present invention is applicable not only to detection of a character string of a designated keyword in a complex background but also to recognition of an arbitrary character string subsequent to the designated character string thus detected. For example, it will be possible to apply to the technique of detecting and recognizing a URL or the like in a television program or a CM. More specifically, a character string such as "http" or "www" typically included in a URL is registered to the character string detection device as a character string of a designated keyword. The character string detection device is configured to include a character recognition function of subsequently recognizing a character string following "http" or "www" when the character string detection device executes character string detection processing according to one or more embodiments of the present invention and the character string of the keyword is detected. In this case, color information on the character is obtained through character string detection processing. It is thus possible to execute character recognition processing by extracting only pixels having the color information or color information similar thereto from an image region following "http" or "www". More specifically, the color of the character is already known upon character recognition processing, and the recognition target region is narrowed to a small area. In this manner, the character string detection device according to one or more embodiments of the present invention is capable of improving detection accuracy and detection efficiency of a character in a complex background, as well as is capable of improving recognition accuracy and recognition efficiency of a character.

The secondary detection unit 30 according to one or more embodiments of the present invention detects a target character in order of the priority rank designated to each character in a designated keyword. The character string detection device according to the present invention is, however, not limited to this configuration. For example, the secondary detection unit 30 can be configured to assume, as characters to be retrieved subsequently to detection of a target character of the first priority rank in an image, both characters adjacent to the already detected character, and retrieve the two adjacent characters in accordance with the priority ranks. In aligned characters, both of the characters adjacent to the already detected character are assumed to be located closest to the already detected character in the image. If these characters are retrieved preferentially with reference to the position of the already detected character in the image, it is possible to detect whether or not the target character string is included more quickly and correctly. Accuracy is further improved because the character of the higher priority rank (in other words, less likelihood of incorrect detection) out of both the adjacent characters is detected preferentially.

In one or more embodiments of the present invention, characters are compared with each other with use of an edge feature of the character. The character string detection device according to the present invention is, however, not limited to this configuration. For example, the primary detection unit 23 and the secondary detection unit 30 in the character string detection device according to one or more embodiments of the present invention can compare characters with use of the template matching technique or a feature value such as roundness of a character or length of a line in the character.

According to one or more embodiments of the present invention, the primary detection unit 23 for executing simple and quick character detection compares with use of the entire target still image of lower resolution upon detection of a candidate character of the first priority rank. If template matching (or comparison of the feature values) with lower resolution by combining a plurality of pixels into a single pixel, it is possible to make quicker determination through lower-load processing.

The present invention is not limited to the embodiments described above, but can be modified variously within the scope defined by the claims. Any embodiment achieved by combining a technical means appropriately modified within the scope defined by the claims will be included in the technical scope of the present invention.

Lastly, each block in the DVD player 1 (character string detection device), particularly each of the units (20 to 31) belonging to the control unit 10, can be configured in accordance with the hardware logic, or can be embodied by software with use of a CPU in the following manner.

The character string detection device includes a central processing unit (CPU) for executing a command of a control program achieving each function, a read only memory (ROM) storing the program, a random access memory (RAM) for developing the program, a storage device (recording medium) such as a memory storing the program and various pieces of data, and the like. One or more embodiments of the present invention supplies to the character string detection device a recording medium recording program codes (an execute form program, an intermediate code program, and a source program) of the control program of the character string detection device serving as software achieving the functions described above so as to be readable with a computer and reading out to execute the program codes recorded in the recording medium with use of the computer (alternatively, a CPU or an MPU).

Examples of the recording medium include tapes such as a magnetic tape and a cassette tape, disks including magnetic disks such as a floppy (registered trademark) disk and a hard disk and optical disks such as a CD-ROM, an MO, an MD, a DVD, and a CD-R, cards such as an IC card (including a memory card) and an optical card, and semiconductor memories such as a mask ROM, an EPROM, an EEPROM, and a flash ROM.

The character string detection device can be alternatively configured so as to be connectable with a communication network, so that the program codes are supplied via the communication network. The communication network is not particularly limited, and it is possible to use, for example the internet, an intranet, an extranet, a LAN, an ISDN, a VAN, a CATV communication network, a virtual private network, a telephone network, a mobile communication network, a satellite communication network, or the like. There is no particular limitation to a transmission medium configuring the communication network, and it is possible to use, for example a wired transmission medium such as IEEE 1394, a USB, a power-line carrier, a cable TV circuit, a telephone wire, or an ADSL, as well as a wireless transmission medium such as infrared like the IrDA and a remote controller, Bluetooth (registered trademark), 802.11 radio, an HDR, a mobile telephone network, a satellite circuit, or a digital terrestrial network. The present invention can be also achieved in the form of computer data signals embedded in carrier waves. In this case, the program codes are embodied by electronic transmission.

One or more embodiments of the present invention also includes the following configurations.

The character string detection device according to one or more embodiments of the present invention further includes a pixel plot means for plotting each pixel in a color space coordinate system based on color information included in each pixel configuring the image. The clustering means is then capable of defining in the color space coordinate system a cluster including a pixel group having the pixels that are plotted in the color space coordinate system by the pixel plot means and that have a distance therebetween smaller than the first threshold.

In the above configuration, the pixel plot means is capable of specifying the color of each pixel based on the color space serving as a clear reference for indicating a color. The clustering means is thus capable of categorizing (clustering) each pixel in accordance with the colors based on the clear reference.

The character string detection device according to one or more embodiments of the present invention further includes a representative color deciding means for deciding a representative color of each cluster defined by the clustering means.

The representative color deciding means is capable of deciding, as the representative color of the cluster, an average value of pieces of color information on the pixel groups belonging to the cluster. The clipping means is capable of partitioning into a region of the pixel group having a distance from the representative color smaller than the second threshold and a region of other pixel groups in the color space coordinate system.

In the above configuration, the clipping means is capable of deciding how similar, to the representative color, a color should be included in a region left in the clipped image with reference to the decided representative color. By setting the second threshold to be variable, it is possible to easily and finely adjust a boundary between a region left in the clipped image and a region excluded therefrom.

A character string detection device according to one or more embodiments of the present invention further includes a cluster selection means for selecting a cluster to be processed by the clipping means and the character string detection means from the plurality of clusters defined by the clustering means. According to one or more embodiments of the present invention, the cluster selection means selects, from unprocessed clusters, a cluster having smallest dispersion of the pixel groups in the cluster in the color space coordinate system as the cluster to be processed.

In the above configuration, each unit for executing the subsequent step (such as the clipping means and the character string detection means) is capable of processing the clusters in accordance with the orders defined by the cluster selection means. The cluster selection means selects a cluster so as to process in order, from a cluster of smaller dispersion.

A character, a graphic, or the like mostly has a single color, unlike a region including a natural background or an actual photographic subject. Color distribution in a cluster having a color of a character string is expected to have extremely smaller variation in comparison to other clusters. Smaller dispersion indicates concentration of colors of pixels in the pixel group in the cluster to a predetermined single color. A cluster of smaller dispersion is more likely to have the color of the character string.

The character string detection device according to one or more embodiments of the present invention can be configured to apply character string detection processing to clusters in order of higher possibility of having the color of the character string. It is thus possible to remarkably improve efficiency of the character string detection processing.

The character string detection device according to one or more embodiments of the present invention includes a low-order detection means for judging whether or not the image possibly includes the detection target character string based on whether or not at least one character in the detection target character string is detected in the image. According to one or more embodiments of the present invention, the clustering means defines the cluster in the image if the low-order detection means judges that the image possibly includes the detection target character string.

In the above configuration, the low-order detection means is capable of instantly judging that the image does not include the detection target character string before inspecting all the characters in the character string if it is confirmed that the image does not include at least one character in the detection target character string. Processing in each of the subsequent steps (from the clustering means) is not applied to an image that does not possibly include the detection target character string.

In this manner, subsequent processing does not need to be uselessly applied to the image that is quickly judged not to include the detection target character string. It is thus possible to remarkably improve efficiency of the character string detection processing.

The low-order detection means in the character string detection device according to one or more embodiments of the present invention compares an image lowered in resolution from an original image and a low-order model that is preliminarily prepared for each character and indicates a feature of the corresponding character, so as to detect a character in the detection target character string, and the low-order model has character features fewer than those of a high-order model that is used by the character string detection means for comparing with the clipped image.

In the above configuration, the low-order detection means compares the image of lower resolution with the low-order model and thus detects a target character (at least one character). In contrast, the character string detection means compares the original image with the secondary model and thus detects all the characters in the detection target character string so as to detect the target character string.

The low-order model is a simple model having information of a quantity smaller than that of the secondary model.

The low-order detection means has only to process information of a quantity much smaller than that processed by the character string detection means through character string detection processing. It is thus possible to judge quickly through low-load processing whether or not the image possibly includes the detection target character string.

The low-order detection means detects a character in order to simply judge whether or not a target character string is possibly included. This judgment is expected to be made quickly through low-load processing in order to find whether or not there is possibility, rather than to judge correctly that "the target character is included". In contrast, such correctness is essential for the character string detection by the character string detection means for finally detecting a character string.

The character string detection device according to one or more embodiments of the present invention quickly achieves character detection processing by the low-order detection means through low-load processing with use of the image of lower resolution and the low-order model, and accurately achieves only character string detection by the character string detection means with use of the image of original resolution and the high-order model.

As a result, it is possible to improve detection accuracy of character string detection processing in the image as well as improve processing efficiency.

The character string detection device according to one or more embodiments of the present invention includes a candidate region specification means for specifying, in the image, a candidate region limited so as to include the character detected by the low-order detection means. According to one or more embodiments of the present invention, the clustering means defines at least one cluster based on the color information included in each pixel configuring the candidate region.

In the above configuration, when the low-order detection means detects at least one character in the target character string, the candidate region specification means specifies the candidate region limited in the entire image so as to include the character. In the subsequent step (the clustering means or the like), character string detection processing needs to be applied only to the candidate region of the limited range in the entire image.

Characters are aligned side by side, so that, if at least one character in the detection target character string is detected, it is possible to estimate the positions of the remaining characters based on the position.

In this manner, processing is applied not to the entire image but only to the candidate region that highly possibly includes any remaining character. It is thus possible to further reduce the processing load and thus further improve processing efficiency.

In the character string detection device according to one or more embodiments of the present invention, the character string detection means can decide, upon detection of one character included in the detection target character string in the image, a character to be detected subsequently out of undetected characters closest to the already detected character in the aligned characters in the detection target character string.

In aligned characters, both of the characters adjacent to the already detected character are assumed to be located closest to the already detected character in the image. If these characters are retrieved preferentially with reference to the position of the already detected character in the image, it is possible to detect more quickly and correctly whether or not the target character string is included in the vicinity of the already detected character.

In the character string detection device according to one or more embodiments of the present invention, the character string detection means limits the detection target region to regions on the right of and below the already detected character if the already detected character is an n-th character in the aligned characters in the detection target character string and the character to be detected subsequently is an (n+1)-th character. According to one or more embodiments of the present invention, the character string detection means limits the detection target region to regions on the left of and above the already detected character if the character to be detected subsequently is an (n−1)-th character.

In the above configuration, it is possible to more correctly narrow the position of the character to be retrieved subsequently with reference to the position of the already detected character based on original alignment of the characters. If the character to be retrieved subsequently follows the already detected character in the alignment of the designated character string, the character to be retrieved subsequently is highly possibly located on the right of the already detected character in horizontal writing and below the already detected character in vertical writing. If the character to be retrieved subsequently precedes the already detected character, the character to be retrieved subsequently is highly possibly located on the left of the already detected character in horizontal writing and above the already detected character in vertical writing.

By retrieving a subsequent character in a narrowed region of higher possibility of detection, it is possible to remarkably reduce the range to which comparison processing is applied. This enables reduction in processing load of character string detection processing and reduction in processing time.

The character string detection method according to one or more embodiments of the present invention can further include, prior to the clustering step, the low-order detection step of judging whether or not the image possibly includes the detection target character string based on whether or not at least one character in the detection target character string is detected in the image. The clustering step can define a cluster in the image if it is judged in the low-order detection step that the image possibly includes the detection target character string.

The character string detection device according to one or more embodiments of the present invention is capable of detecting a designated character in an image in short time through low-load processing. The character string detection device is applicable to any type of image processing device that is capable of processing still images, video images, or both of still and video images, such as a digital video recorder/player, a Blu-ray disc recorder/player, a digital video camera, a digital camera, a digital television, a personal computer (PC), a mobile phone, a printer, a scanner, a multi-function device, and a facsimile device. The character string detection device according to one or more embodiments of the present invention is capable of detecting a character string in short time without affecting the real-time property even in processing a video image of a high load. It is thus particularly advantageous to apply the character string detection device according to one or more embodiments of the present invention to a video processing device or a video reproduction device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

DESCRIPTION OF SYMBOLS

1 DVD player (Character string detection device/Image processing device)
10 Control unit
11 Storage unit
12 Display unit
13 Operation unit
14 Temporary storage unit
15 Bus
20 Video reproduction unit
21 Still image generation unit
22 Feature value extraction unit (Feature value extraction means)
23 Primary detection unit (Low-order detection means)
24 Candidate region specification unit (Candidate region specification means)
25 Pixel plot unit (Pixel plot means)
26 Clustering unit (Clustering means)
27 Representative color deciding unit (Representative color deciding means)
28 Cluster selection unit (Cluster selection means)
29 Clipping unit (Clipping means)
30 Secondary detection unit (Character string detection means)
31 Character string determination unit (Character string determination means)
40 Image storage unit
41 Keyword storage unit
42 Character information storage unit
70 Trimmed image
71 Trimmed data
72 Map information
73 Clipped data
80 Candidate character position
81 Candidate character position
85 Cluster
86 Cluster
87 Cluster
90 Candidate region
91 Candidate region
92 Candidate region

The invention claimed is:

1. A character string detection device for detecting a character string including at least one character in an image, the character string detection device comprising:
a clustering unit that defines at least one cluster including at least a fixed number of pixel groups having similar colors based on color information included in each pixel configuring the image;
a clipping unit that partitions the image into a region of the pixel groups belonging to the cluster defined by the clustering unit and a region of other pixel groups, and generating a clipped image excluding the region of the other pixel groups from the image; and
a character string detection unit that detects each character in a detection target character string to be detected so as to detect the detection target character string in the clipped image generated by the clipping unit, wherein
the character string detection unit decides, upon detection of one character included in the detection target character string in the image a character to be detected subsequently out of undetected characters closest to the already detected character in the aligned characters in the detection target character string,
the character string detection unit limits a detection target region to regions on a right of and below the already detected character if the already detected character is an n-th character in the aligned characters in the detection target character string and the character to be detected subsequently is an (n+1)-th character, and
the character string detection unit limits the detection target region to regions on a left of and above the already detected character if the character to be detected subsequently is an (n−1)-th character.

2. The character string detection device according to claim 1, further comprising:
a pixel plot unit that plots each pixel in a color space coordinate system based on the color information included in each pixel configuring the image;
wherein the clustering unit defines in the color space coordinate system a cluster including a pixel group having the pixels that are plotted in the color space coordinate system by the pixel plot unit and that have a distance therebetween smaller than a first threshold.

3. The character string detection device according to claim 2, further comprising:
a representative color deciding unit that decides a representative color of each cluster defined by the clustering unit;
wherein the representative color deciding unit decides, as the representative color of the cluster, an average value of pieces of color information on the pixel groups belonging to the cluster, and
wherein the clipping unit partitions into a region of the pixel group having a distance from the representative color smaller than a second threshold and a region of other pixel groups in the color space coordinate system.

4. The character string detection device according to claim 3, further comprising:
a cluster selection unit that selects a cluster to be processed by the clipping unit and the character string detection unit from the plurality of clusters defined by the clustering unit;
wherein the cluster selection unit selects, from unprocessed clusters, a cluster having smallest dispersion of the pixel groups in the cluster in the color space coordinate system as the cluster to be processed.

5. The character string detection device according to claim 4, further comprising:
a primary detection unit that judges whether the image possibly includes the detection target character string based on whether at least one character in the detection target character string is detected in the image;
wherein the clustering unit defines the cluster in the image if the primary detection unit judges that the image possibly includes the detection target character string.

6. The character string detection device according to claim 3, further comprising:
a primary detection unit that judges whether the image possibly includes the detection target character string based on whether at least one character in the detection target character string is detected in the image;
wherein the clustering unit defines the cluster in the image if the primary detection unit judges that the image possibly includes the detection target character string.

7. The character string detection device according to claim 6,
wherein the primary detection unit compares an image lowered in resolution from an original image and a low-order model that is preliminarily prepared for each character and indicates a feature of the corresponding character, so as to detect a character in the detection target character string, and
wherein the low-order model has character features fewer than those of a high-order model that is used by the character string detection unit for comparing with the clipped image.

8. The character string detection device according to claim 2, further comprising:
a cluster selection unit that selects a cluster to be processed by the clipping unit and the character string detection unit from the plurality of clusters defined by the clustering unit;
wherein the cluster selection unit selects, from unprocessed clusters, a cluster having smallest dispersion of the pixel groups in the cluster in the color space coordinate system as the cluster to be processed.

9. The character string detection device according to claim 8, further comprising:
a primary detection unit that judges whether the image possibly includes the detection target character string based on whether at least one character in the detection target character string is detected in the image;
wherein the clustering unit defines the cluster in the image if the primary detection unit judges that the image possibly includes the detection target character string.

10. The character string detection device according to claim 2, further comprising:
a primary detection unit that judges whether the image possibly includes the detection target character string based on whether at least one character in the detection target character string is detected in the image;
wherein the clustering unit defines the cluster in the image if the primary detection unit judges that the image possibly includes the detection target character string.

11. The character string detection device according to claim 10,
wherein the primary detection unit compares an image lowered in resolution from an original image and a low-order model that is preliminarily prepared for each character and indicates a feature of the corresponding character, so as to detect a character in the detection target character string, and
wherein the low-order model has character features fewer than those of a high-order model that is used by the character string detection unit for comparing with the clipped image.

12. The character string detection device according to claim 1, further comprising:
a primary detection unit that judges whether the image possibly includes the detection target character string based on whether at least one character in the detection target character string is detected in the image;
wherein the clustering unit defines the cluster in the image if the primary detection unit judges that the image possibly includes the detection target character string.

13. The character string detection device according to claim 12,
wherein the primary detection unit compares an image lowered in resolution from an original image and a low-order model that is preliminarily prepared for each character and indicates a feature of the corresponding character, so as to detect a character in the detection target character string, and
wherein the low-order model has character features fewer than those of a high-order model that is used by the character string detection unit for comparing with the clipped image.

14. The character string detection device according to claim 12, further comprising:
a candidate region specification unit that specifies, in the image, a candidate region limited so as to include the character detected by the primary detection unit,
wherein the clustering unit defines at least one cluster based on the color information included in each pixel configuring the candidate region.

15. An image processing device comprising the character string detection device according to claim 1.

16. A character string detection method of detecting a character string including at least one character in an image, the character string detection method comprising:
defining at least one cluster including at least a fixed number of pixel groups having similar colors based on color information included in each pixel configuring the image;
partitioning the image into a region of the pixel groups belonging to the defined cluster and a region of other pixel groups, and generating a clipped image excluding the region of the other pixel groups from the image; and
detecting each character in a detection target character string to be detected so as to detect the detection target character string in the clipped image, wherein
the detecting further comprises
deciding, upon detection of one character included in the detection target character string in the image, a character to be detected subsequently out of undetected characters closest to the already detected character in the aligned characters in the detection target character string,
limiting a detection target region to regions on a right of and below the already detected character if the already detected character is an n-th character in the aligned characters in the detection target character string and the character to be detected subsequently is an (n+1)-th character, and limiting the detection target region to regions on a left of and above the already detected character if the character to be detected subsequently is an (n−1)-th character.

17. The character string detection method according to claim 16, further comprising:
  prior to defining the cluster, judging whether the image possibly includes the detection target character string based on whether at least one character in the detection target character string is detected in the image;
  wherein the defining further comprises defining a cluster in the image if it is judged that the image possibly includes the detection target character string.

18. A non-transitory computer-readable storage medium storing a control program that causes a computer to perform:
  defining at least one cluster including at least a fixed number of pixel groups having similar colors based on color information included in each pixel configuring the image;
  partitioning the image into a region of the pixel groups belonging to the defined cluster and a region of other pixel groups, and generating a clipped image excluding the region of the other pixel groups from the image; and
  detecting each character in a detection target character string to be detected so as to detect the detection target character string in the clipped image, wherein
  the detecting further comprises
    deciding, upon detection of one character included in the detection target character string in the image, a character to be detected subsequently out of undetected characters closest to the already detected character in the aligned characters in the detection target character string,
    limiting a detection target region to regions on a right of and below the already detected character if the already detected character is an n-th character in the aligned characters in the detection target character string and the character to be detected subsequently is an (n+1)-th character, and
  limiting the detection target region to regions on a left of and above the already detected character if the character to be detected subsequently is an (n−1)-th character.

\* \* \* \* \*